(12) United States Patent
Cai

(10) Patent No.: US 6,405,637 B1
(45) Date of Patent: Jun. 18, 2002

(54) FLUID DELIVERY SYSTEM FOR GENERATING PRESSURE PULSES TO MAKE BEVERAGES

(75) Inventor: Edward Z. Cai, Corvallis, OR (US)

(73) Assignee: Houseware Technology Group LLC, Corvallis, OR (US)

( * ) Notice: Subject to any disclaimer, the term of this patent is extended or adjusted under 35 U.S.C. 154(b) by 0 days.

(21) Appl. No.: 09/482,510

(22) Filed: Jan. 13, 2000

(51) Int. Cl.[7] .................................................. A47J 31/00
(52) U.S. Cl. ......................... 99/293; 99/299; 99/302 R; 99/305; 99/307
(58) Field of Search ..................... 99/293, 299, 302 R, 99/307, 305, 280, 283, 295

(56) References Cited

U.S. PATENT DOCUMENTS

| | | | |
|---|---|---|---|
| 3,405,630 A | 10/1968 | Weber, III | |
| 4,083,295 A | 4/1978 | Hollingsworth | 99/283 |
| 4,158,330 A | 6/1979 | Vitous | 99/295 |
| 4,457,217 A | 7/1984 | Ogawa | 99/295 |
| 4,634,838 A | 1/1987 | Berz | 99/281 X |
| 4,644,856 A | 2/1987 | Borgmann | 99/295 |
| 4,660,466 A | 4/1987 | Fries et al. | 99/294 |
| 4,741,260 A | 5/1988 | Boliver | 99/279 |
| 4,760,774 A | 8/1988 | Lin | 99/299 |
| 4,800,805 A | 1/1989 | Mahlich et al. | 99/293 |
| 4,852,474 A | 8/1989 | Mahlich et al. | 99/293 |
| 4,882,982 A | 11/1989 | Muttoni | 99/295 |
| 4,882,983 A | 11/1989 | Pastrick | 99/295 |
| 4,960,042 A | 10/1990 | Grossi | 99/293 |
| 5,027,696 A | 7/1991 | Antonini | 99/279 |
| 5,115,730 A | 5/1992 | Gockelmann | 99/280 |
| 5,200,221 A | 4/1993 | Knepler | 426/231 |
| 5,267,506 A | 12/1993 | Cai | 99/280 |
| 5,330,266 A | 7/1994 | Stubaus | 366/101 |
| 5,531,152 A * | 7/1996 | Gardosi | 99/289 R |
| 5,638,740 A | 6/1997 | Cai | 99/295 |
| 5,738,002 A | 4/1998 | Marano-Ducarne | 99/293 |
| 5,768,981 A | 6/1998 | Cicchetti | 99/453 |
| 5,769,135 A | 6/1998 | Mahlich | 99/293 X |
| 5,800,707 A | 9/1998 | Mehnert et al. | 210/232 |
| 5,862,740 A | 1/1999 | Grossi | 99/293 |
| 5,943,472 A * | 8/1999 | Charles et al. | 99/280 X |
| 6,148,717 A * | 11/2000 | Lassota | 99/283 |

* cited by examiner

*Primary Examiner*—Reginald L. Alexander

(57) ABSTRACT

Apparatus includes a water reservoir, a container for containing flavor-containing materials and a fluid delivery system for generating a plurality of pressure pulses, each including a water pulse and a steam pulse, and for delivering the pressure pulses through the flavor-containing materials. This extracts the useful compounds out of the flavor-containing materials under the pressure of the pressure pulses. The fluid delivery system includes a chamber, a heater in heat conducting relation with the chamber, a valve disposed between the reservoir and the chamber which opens to permit water to flow from the reservoir to the chamber when pressure in the chamber drops below a predetermined pressure. Method for making flavor-containing liquid with a plurality of pressure pulses includes generating and delivering a first pressure pulse in the form of a pressurized hot water pulse and a pulse of pressurized steam to and through the flavor-containing materials in a container. The flavor-containing materials is extracted by the pulse of pressurized hot water under the pressure of the first pressure pulse and are dried or potentially re-roasted by the pulse of pressurized hot steam. The next step is to generate and deliver a second similar pressure pulse, again, to and through the flavor-containing materials. The steps of generating and delivering pressure pulses to and through the flavor-containing materials can be repeated until a desired amount of flavor-containing liquid has been prepared.

60 Claims, 5 Drawing Sheets

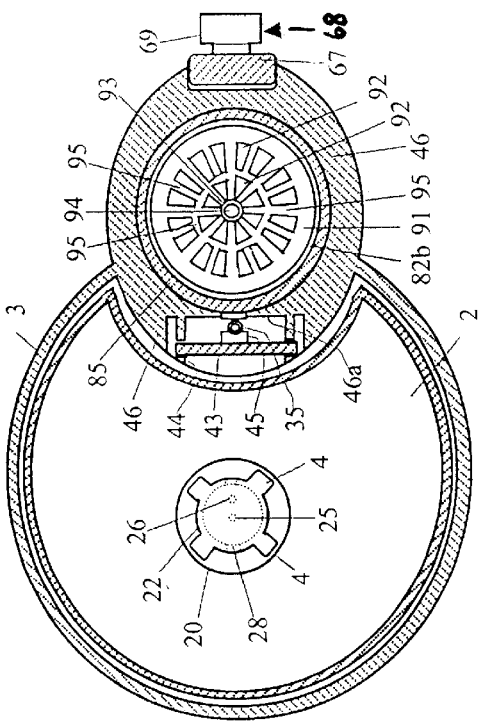
FIG. 3
FIG. 2
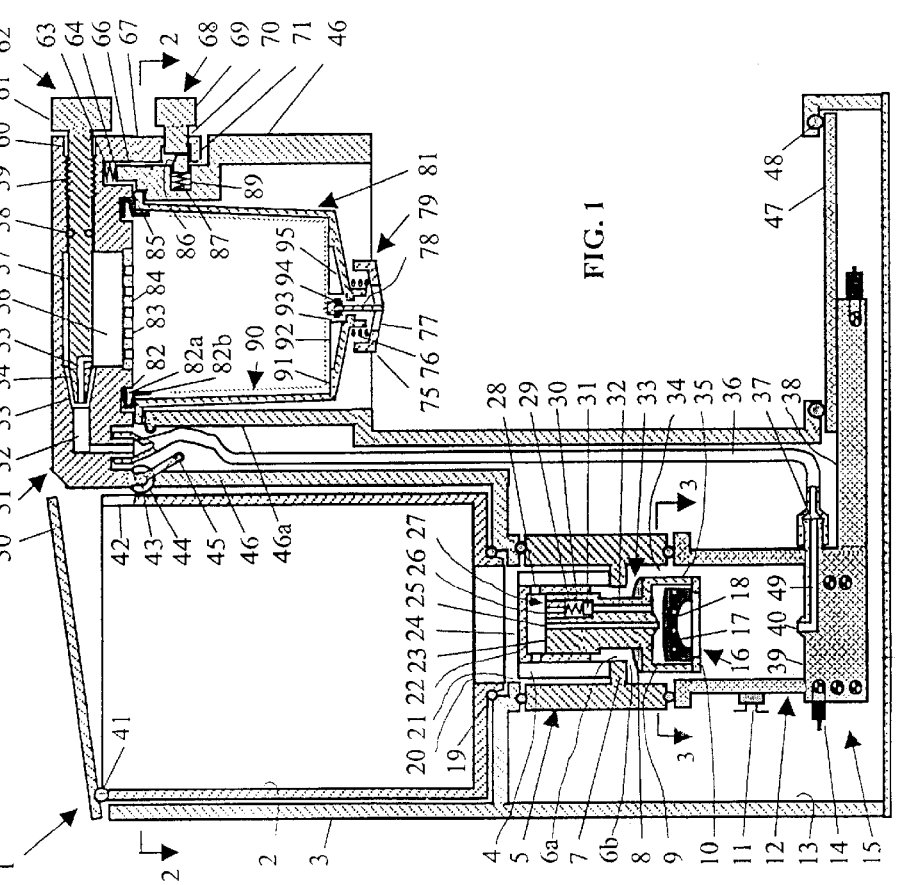
FIG. 1

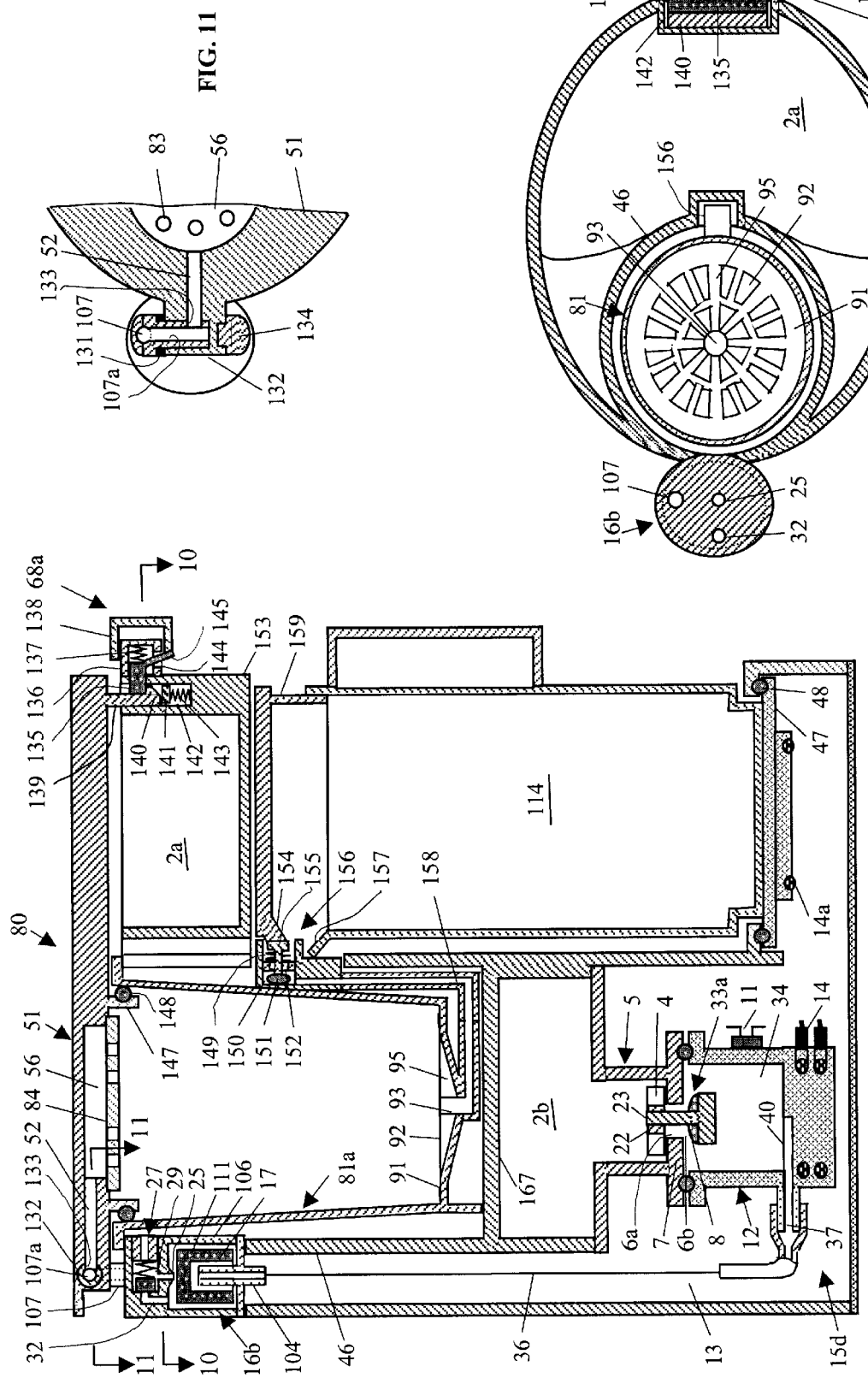

US 6,405,637 B1

FLUID DELIVERY SYSTEM FOR GENERATING PRESSURE PULSES TO MAKE BEVERAGES

FIELD OF THE INVENTION

The present invention relates to an apparatus and method for improving the extraction of flavor-containing materials such as coffee, tea, herb or cocoa with hot water or steam pulse and for improving the taste and quality of beverages.

BACKGROUND OF THE INVENTION

It has been known for centuries to prepare coffee, tea, herb extracts and other flavor-containing liquids by steeping the corresponding flavor-containing solid materials in hot water under ambient or elevated pressure. The steeping of roasted and ground coffee under ambient pressure emerged in late $14^{th}$ century and has been automated with the inventions of stove-top percolator in 1820's, electric percolator in 1950's, and automatic drip coffee maker in the 1970s. The steeping of ground coffee under elevated pressure, resulting in the well-known espresso drinks, emerged with the invention of steam espresso machine in 1910's and later improved by the inventions of piston espresso machine in 1940's and pump espresso machine in 1960's.

Extraction time and temperature are among the most critical considerations when brewing coffee. Automatic drip coffee makers brew better coffee than percolators by avoiding re-boiling coffee and reducing extraction time, thus preserving the aroma and reducing coffee bitterness. (The bitter, less soluble chemicals in the grounds require longer extraction time.) Shorter extraction time, however, normally causes incomplete flavor extraction, which may have contributed to the weaker coffee made by most single-cup coffee makers and water displacement-type coffee makers (U.S. Pat. No. 5,200,221). It is generally believed that the best water temperature is between 197° to 205° F., which can be easily achieved by boiling water in a percolator but more difficult to achieve in automatic drip coffee maker.

In the applicant's earlier U.S. Pat. No. 5,267,506, apparatus for making coffee, espresso, tea or the like by steeping the flavor-containing materials in hot water under elevated pressure are disclosed. In that patent, first and a second embodiments are described in which a cell in contact with a heating element draws an amount of water from a water reservoir and subsequently heats the water and generates pressurized steam above the hot water in the cell. In the first embodiment, the hot water in the cell is delivered to and through the flavor-containing materials under the pressure of the pressurized steam, and the pressurized steam is then released through an automatic steam release valve. In the second embodiment, the hot water under the pressure of the pressurized steam in the cell is first delivered and the pressurized steam is later delivered to and through the flavor-containing materials.

Such apparatus have numerous advantages including higher brewing speed, less flavor loss and lower cost over known coffee makers and espresso machines described above. However, significant advancements can still be made with such apparatus to improve the taste and quality of the liquid extraction as well as the ease of use, safety and cost of the apparatus. In fact, the apparatus with the invention disclosed here were found to make surprisingly, drastically better tasting coffee than the best commercially available coffee makers when the same coffee grounds was used, according to expert tasting tests.

SUMMARY OF THE INVENTION

An apparatus for extracting flavor-containing materials such as coffee and the like is provided. The apparatus includes a water reservoir for receiving a supply of water, a container for containing an amount of the flavor-containing materials and for allowing the extraction of the flavor-containing materials under pressure therein, and a fluid deliver system. The fluid delivery system is provided for generating a plurality of pressure pulses, each pressure pulse including a hot water pulse and a steam pulse, and for delivering the plurality of pressure pulses through the flavor-containing materials in the container. This extracts the useful compounds out of the flavor-containing materials under the pressure of the pressure pulses. The fluid delivery system includes a chamber, a heater in heat conducting relation with the chamber to heat water in the chamber and to is produce steam. Also included is a conduit for delivering water from the reservoir to the chamber, and valve disposed in the conduit between the reservoir and the chamber which opens to permit water to flow from the reservoir to the chamber when pressure in the chamber drops below a predetermined pressure. Also included is a fluid passage connecting the chamber and the container to allow the hot water and steam to be forced through the flavor-containing materials in the container by the pressure of the pressure pulse.

Another aspect of the invention is a method for making flavor-containing liquid by extracting flavor-containing material such as coffee or the like with a plurality of pressure pulses. The method includes generating and delivering a first pressure pulse in the form of a pressurized hot water pulse and a pulse of pressurized steam to and through the flavor-containing materials in a container. The flavor-containing materials are extracted by the pulse of pressurized hot water under the pressure of the first pressure pulse and are dried or potentially re-roasted by the pulse of pressurized hot steam. The next step is to generate and deliver a second pressure pulse comprising a pulse of pressurized hot water and a pulse of pressurized hot steam, again, to and through the flavor-containing materials in a container. Thus, the flavor-containing materials are extracted by the pulse of pressurized hot water under the pressure of the second pressure pulse and being dried or potentially re-roasted by the pulse of pressurized hot steam. The steps of generating and delivering pressure pulses to and through the flavor-containing materials are repeated until a desired amount of flavor-containing liquid has been prepared.

It is an object of the present invention to provide an apparatus and method for making better tasting beverages such as better tasting coffee, espresso, cappuccino, latte, or tea.

It is a further object of the present invention to provide an apparatus that has a more effective and powerful water and steam delivery system for uses in making beverages.

These and other objectives and advantages of the present invention will become apparent from the following description of the preferred embodiments, taken together with the accompanying drawings.

DESCRIPTION OF THE DRAWING

The accompanying drawing illustrates diagrammatically non-limitative embodiment of the invention, as follows:

FIG. 1 is a side elevation sectional view of a first embodiment of the present invention, for extracting flavor-containing materials using pressure pulse in accordance with the present invention;

FIG. 2 is a sectional view along line 2—2 of FIG. 1;

FIG. 3 is a sectional view along line 3—3 of FIG. 1;

FIG. 9 is a side elevation, sectional view of another embodiment of the apparatus shown in FIG. 1;

FIG. 10 is a top plan sectional view along line 10—10 of FIG. 9;

FIG. 11 is a top plan, fragmentary sectional view along line 11—11 of FIG. 9.

DETAILED DESCRIPTION OF THE PREFERRED EMBODIMENTS

FIG. 1 shows certain parts of an apparatus 1 for making beverages such as coffee, tea, espresso and latte, which embodies one form of the present invention. Only those parts of the apparatus are shown which are necessary for full understanding of the invention. For example, the receptacle for receiving the brewed beverage and the parts for connecting the energy-consuming units of the apparatus to an energy source such as an electrical outlet have been omitted for the sake of clarity and simplicity. All such parts which are not specifically shown but necessary in order to render the apparatus fully operative can be similar, analogous or identical to the corresponding parts heretofore conventionally known and used in existing apparatus for making beverages such as coffeemakers, espresso machines or tea makers.

Figure 8A:
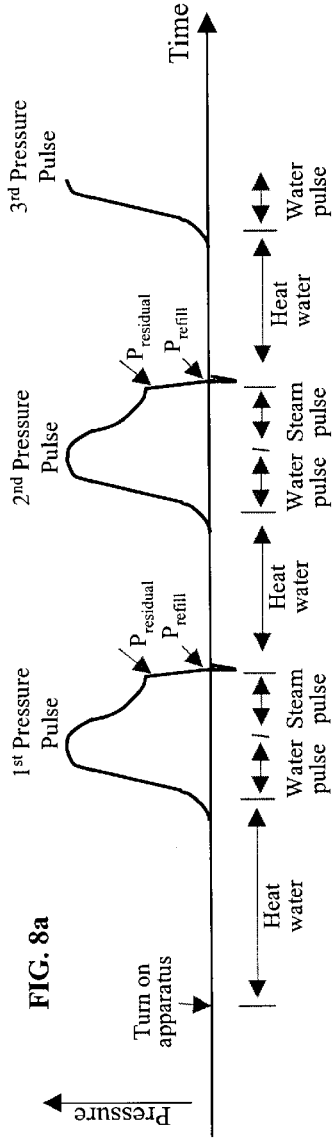
FIGS. 8a, 8b and 8c are schematic diagrams showing three exemplary patterns of pressure pulses that may be generated by the embodiments depicted above.

Apparatus 1 of FIG. 1 comprises a removable water reservoir 2 housed in chamber 3, a ThermoCell pump 15 comprising an upper ThermoCell body 5, a lower Thermo-Cell body 12, a filling valve 33 and a residual pressure relief valve 16 for generating and delivering multiple pressure pulses, each comprising a pressurized hot water pulse followed by a pressurized steam pulse, as shown in FIG. 8a and discussed in detail later, and a brew basket 81 sealed to a brew head 51 for receiving the multiple pressure pulses and allowing the extraction of flavor-containing materials such as coffee, tea or herbs therein by the multiple pressure pulses. During each of the multiple pressure pulses, the ThermoCell pump first delivers the pressurized hot water pulse through the flavor-containing materials in the brew basket under pressure of the pressure pulse, thus extracting flavor or useful compounds out of the flavor-containing materials, and later the pressurized hot steam pulse through the flavor-containing materials under pressure of the pressure pulse, drying and possibly re-roasting the flavor-containing materials to create more flavor or aroma. Not too surprisingly, numerous tasting tests conducted by coffee experts showed that the coffee brewed by the apparatus tastes drastically better than the coffee made by the best commercially available coffee makers when the same coffee grounds are used.

It is theorized that the better coffee taste and quality is probably due to the shorter "effective" contact time between the water and coffee grounds since the hot water pulses in the pressure pulses constitute only a fraction of the total time used to brew a pot, e.g. 10 cups, of coffee, the improved extraction of the flavor-containing materials under the pressure of the multiple pressure pulses, the roasting effect of the grounds by the hot steam, the changes in pressure applied to the grounds between and within the pressure pulses, or other factors unknown to the inventor at this time.

The removable water reservoir 2 has a lid 50 attached by a hinge 41, a recess 42 formed on the right side for facilitating the opening of the brew head 51 while the reservoir is in place, and outlet 20 configured to form a water tight seal to the outlet 21 of the chamber 3 via o-ring 19 when reservoir 2 is placed into the chamber. The cross-section of the removable reservoir is shown is FIG. 2. The outlet 20 has a reservoir valve, not shown in FIG. 1 for the sake of simplicity, disposed in the outlet for closing the outlet 20 when the reservoir 2 is removed from the chamber 3 and opening the outlet when the reservoir 2 is placed into the chamber. This valve is similar to the corresponding valves used in the existing automatic drip coffee makers or p[]ump espresso in machines with removable water reservoirs. It is appreciated that the removable water reservoir 2 is optional and the chamber 3 can be used as the water reservoir for the apparatus 1.

ThermoCell pump 15 (FIG. 1) is attached to the outlet 21 of the chamber 3 and housed in chamber 13. The upper ThermoCell body and lower ThermoCell body are attached in a leak proof way, resulting in a chamber 34, which comprises the space defined by the upper and lower ThermoCell bodies. The chamber 34 is also called ThermoCell 34, and the two names will be used interchangeably hereafter. The upper ThermoCell body has a base 7 and an opening 6a formed on the base for receiving the filling valve 33. An electric heater 14 is cast or- staked into the bottom portion of the lower ThermoCell body 12 for heating the water and generating pressurized steam in the chamber 34. (Note: To make the ThermoCell pump shorter, it is also possible to have part or all the electric heater 14 cast into, attached or staked to the side wall of the lower ThermoCell body.) The upper ThermoCell body 5 and lower ThermoCell body 12 may be constructed to give the ThermoCell or chamber 34 a volume of approximately 3 to 300 cc, preferably approximately 10 to 150 cc, depending on the need of the apparatus in which the ThermoCell is used. The upper and lower ThermoCell bodies may be constructed to give the ThermoCell or chamber 34 a cylindrical shape, as shown in FIGS. 1 and 2, or any other shape such as oval, tubular or square shape as needed. A temperature control device such as a thermostat 11 is attached to the lower ThermoCell body for automatically turning off the electricity to the heater 14 when the temperature is raised to a predetermined value. The lower and upper ThermoCell bodies may be made of the same or different heat and pressure resistant materials such as aluminum, stainless steel or polyimide.

A pump outlet 37 is formed at the lower ThermoCell body and is connected to brew head 51 via a heat and pressure resistant conduit 36. The pump outlet 37 is connected to the inside of the lower ThermoCell body via a channel 49 and an outlet port 40. The temperature of the water or steam exiting the pump outlet may be increased by further heating the water or steam in channel 49. The further heating can be effected by constructing the channel near the hotter area of the lower ThermoCell body, reducing the channel size or increasing the channel length. The amount of steam produced by the ThermoCell pump may be increased by raising the outlet port 40 above bottom surface 39 or by the further heating and evaporation of water in channel 49. The lower ThermoCell body is connected to a warmer plate 47, which is insulated from the housing of the apparatus 1 by a heat resistant gasket 48, by heat conductor 38 for conducting some of the heat generated the heater to the brewed beverage in a receptacle such as a carafe or cup on the warm plate. Part of the electric heater 14 may be located in the heat conductor 38 to improve the warming efficiency of the brewed beverage.

The filling valve 33 comprises an upper valve body 22 having four radial wings 4 (FIG. 2) for maintaining the upper valve body on the base 7 of the upper ThermoCell body 5, a lower valve body 23 (FIG. 1) attached to the upper valve body, the opening 6a formed on the base 7, a valve seal 8 attached to the lower valve body for to closing the opening 6a when the filling valve is raised against the base 7, and a cylindrical opening 6b between the bottom of the base 7 and the seal member 8. The filling valve is constructed to allow it move up and down relative to the base 7 freely within a predetermined distance, which determines the size of the opening 6b. The residual pressure relief valve 16 and a safety valve 27 are located in the lower valve body 23 and communicates with removable reservoir 2 or atmosphere via two openings 28 formed on the side wall of the upper valve body 22. The upper valve body 22 has a top wall 24 for preventing the steam or hot water from the residual pressure relief valve or the safety valve 27 from harming the consumers or users. (It should be noted the residual pressure relief valve and safety valve are not essential to the functions of the filling valve and may be relocated to places other than the lower valve body, as exemplified in FIGS. 4 and 9.)

The filling valve 33 and the residual pressure relief valve 16 play a central role in the generation and delivery of the multiple pressure pulses. To generate and deliver the $1^{st}$ pressure pulse (FIG. 8a), the filling valve should allow a certain amount of water in the reservoir 2 to flow into the ThermoCell 34 and replace the air originally in the ThermoCell. To build the steam pressure in the ThermoCell to force first the hot water as the water pulse then the pressurized steam as the steam pulse in the ThermoCell out of the outlet 37, the filling valve should close timely and properly during the $1^{st}$ pressure pulse. To generate and deliver the $2^{nd}$ pressure pulse, the ThermoCell needs to be refilled timely with water from the reservoir 2. The filling valve 33 is designed to open the openings 6a and 6b when the pressure in the ThermoCell is below a predetermined value or $P_{refill}$, which will be discussed in detail later. The residual pressure relief valve 16 functions to quickly relieve the pressure or steam in the ThermoCell to $P_{refill}$, thus causing the filling valve to open and initiating the $2^{nd}$ pressure pulse (see FIG. 8a). Since the residual pressure relief valve 16 is critical for the operation of the filling valve, its structures and functions are discussed below prior to the further discussions on the filling valve.

The residual pressure relief valve 16 comprises a cylindrical chamber 9 formed at the bottom of the lower valve body 23, a channel 25 having a lower end protruded slightly into the chamber 9 and an upper end located at the top surface of the lower valve body 23 for communicating with the reservoir 2 or atmosphere, a cylindrical seal member 17 in chamber 9, and a keeper 10 at the bottom of the side wall 35 of the chamber 9 for keeping the seal member in the chamber. The seal member 17 has a concave or recessed bottom surface 18 constructed to collect air and steam generated by heater 14 and to stabilize the seal member, thus facilitating the sealing of the channel 25 by the seal member, and a convex or dome-like upper surface for minimizing the amount of water that may remain on it after the water in the ThermoCell pump has been delivered. The keeper 10 consists of four small bars extended inwardly from side wall 35 (refer also to FIG. 3). The seal member is made of one rubber or elastomer (e.g. silicone or polyisoprene) part or of a plastic part with a rubber part attached to it to improve the seal against the lower end of the channel 25.

It is preferred that the seal member 17 has specific gravity close to or smaller than the density of water. The materials that result in a lower overall specific gravity for the seal member generally enable better seal between the seal member 17 and the lower end of the channel 25. The specific gravity or density of the seal member may be lowered by enclosing air into or attaching light materials to the seal member. The distance between the lower end of the channel 25 and the seal member 17, while resting on chamber base 10, is about 0.02 to 0.7 cm, preferably about 0.05 to 0.3 cm to reduce the upward movement of the seal member needed to close the channel, thus facilitating the sealing of the channel 25.

After the seal member 17 closes the channel 25, the pressure in the ThermoCell exerts a force, which is approximately equal to the product of the area of the lower end of the channel 25 multiplying the pressure, to the seal member, thus preventing the seal member from opening the channel 25 even after all the water has been forced out of the ThermoCell by the pressure. The residual pressure relief valve will open the channel 25 to relieve the pressure in the ThermoCell 34 when the pressure therein declines to a predetermined pressure $P_{residual}$, which is thereafter called residual pressure or $P_{residual}$. To quickly relieve the pressure or steam in the ThermoCell pump after the pressure therein reaches $P_{residual}$, the channel 25 should have small flow resistance, which is primarily determined by the structure and dimension of the channel 25 and by whether the upper end of the channel is below water in the reservoir 2. It is suspected that if the upper end of the channel 25 is below water, the steam exiting the ThermoCell pump via the channel may condense near the upper end of the channel by the cold water in the reservoir 2, thus causing a partial vacuum at the upper end of the channel and increasing speed of steam relieving through the channel.

The weight ($W_1$) of the seal member 17 and the size or area ($A_1$) of the opening at the lower end of the channel 25 which is in contact with the seal member approximately determine the residual pressure or $P_{residual}$ according approximately to the equation:

$$P_{residual} = W_1/A_1$$

where $A_1$ is in cm$^2$ and $W_1$ in kilograms. $P_{residual}$ was mentioned earlier and is the pressure at which the residual pressure relief valve 16 opens the channel 25 and subsequently relieves the steam in the ThermoCell pump. When the pressure in the ThermoCell pump is lower than $P_{residual}$, the pressure force applied to the seal member 17 is smaller than the weight ($W_1$) of the seal member and the seal member will fall off the lower end of the channel 25 and opens the channel if there is no other force such as buoyancy force exerted onto the seal member. When the pressure in the ThermoCell pump is higher than $P_{residual}$, the force applied to the seal member 17 is larger than the weight ($W_1$) of the seal member and will allow the seal member to remain attached to the lower end of the channel 25. Obviously, one can choose any specific $P_{residual}$ for the apparatus 1 by changing either the weight ($W_1$) of the seal member 17 and the area ($A_1$) of the opening at the lower end of the channel 25. It should, however, be noted that certain properties such as hardness and elasticity and surface roughness of the seal member 17, the shape and structure of the seal member 17, the shape and structure of the opening at the lower end of the channel 25, any upward force for the fluid or heating etc. can impact the residual pressure at which the pressure in the ThermoCell pump is relieved. For a ThermoCell pump of normal size and wattage for delivering and forcing water or steam through low flow resistance materials such as drip coffee grounds, tea or coarse water filtration materials, $W_1$ may range from approximately 0.1 grams to approximately 200 grams, preferably approximately 0.5 to 50 grams, although lighter or heavier $W_1$ is possible for very small or large ThermoCell pumps; $A_1$ may range from approximately 0.001 cm, to approximately 1 $cm^2$, preferably approximately 0.004 to 0.2 $cm^2$; a combination of $W_1$ and $A_1$ is normally selected to result in $P_{residual}$ of approximately 0.01 $kg/cm^2$ to approximately 5 $kg/cm^2$, preferably approximately 0.05 to 2 $kg/cm^2$. For a ThermoCell pump of normal size and wattage for delivering and forcing water or steam through high flow resistance materials such as espresso grounds or fine water filtration materials, $W_1$ and $A_1$ can be designed to have higher $P_{residual}$, such as approximately 0.1 to 10 $kg/cm^2$. The effects of the residual pressure ($P_{residual}$) on the brewing process and the resulting beverages will be shown later in FIGS. 8a to 8c.

Figure 5:
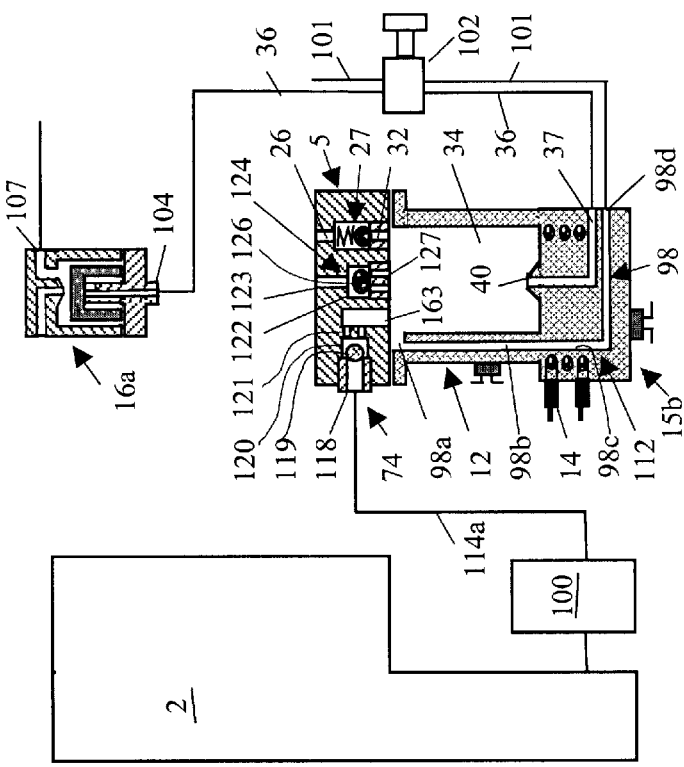
FIG. 5 is a side elevation, sectional, partially-schematic view of another modified embodiment, using a mechanical pump rather than gravity to deliver water to ThermoCell 15.
Figure 4:
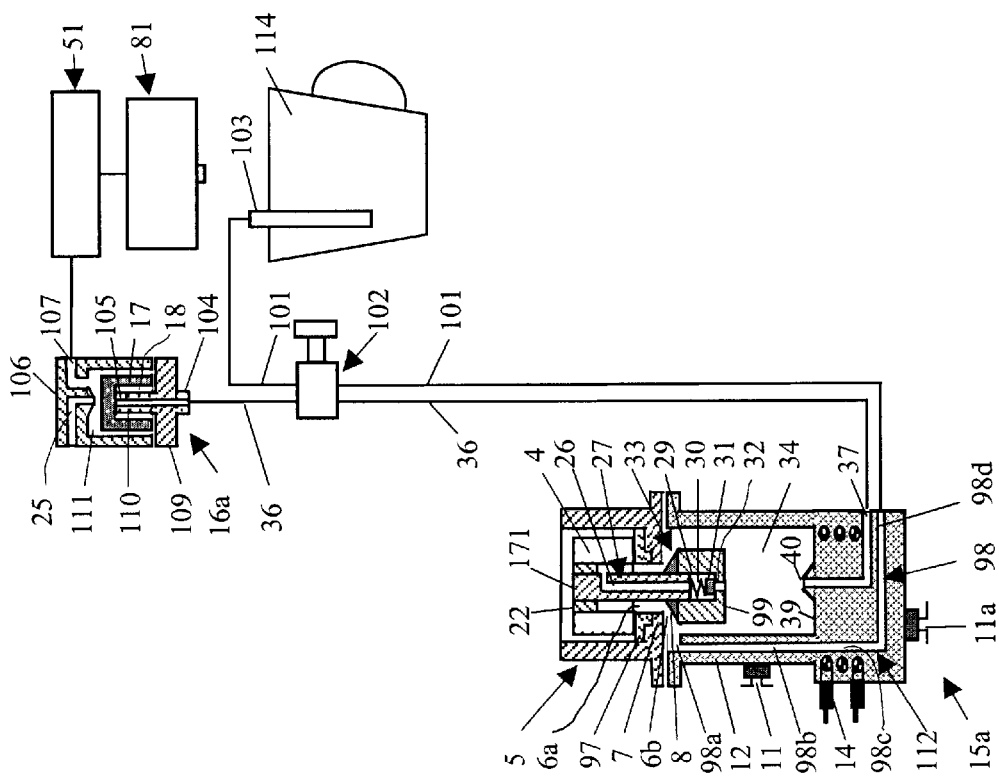
FIG. 4 is a side elevation, sectional, partially-schematic view of a modified version of the embodiment of FIG. 1 to produce steam pulse for making hot beverages.

It is appreciated that the residual pressure relief valve 16 or any of its components may have different structure, configurations or shape. For example, the side wall 35 of the chamber 9 may be partially or completely removed and a keeper 10 may comprise four L-shaped bars extended downward for keeping the seal member 17 directly below the lower end of the channel 25 and allowing the seal member to move upwards or downwards freely to close or open the channel 25. It is also appreciated that the residual pressure relief valve 16. may be separated from the lower valve body 23 of the filling valve 33 and be located anywhere as long as one end of channel 25 is connected to the interior of the ThermoCell pump. Such examples are shown in FIGS. 4, 5 and 9, where the residual pressure relief valve is located between the outlet 37 of the lower ThermoCell body 12 and the brew head 51. Each of the FIGS. 4, 5 and 9 will be discussed in detail below. Another such example is that the residual pressure relief valve 16 is removed from the filling valve 33 and is affixed to the upper ThermoCell body 5. In this example, the channel 25 of the residual pressure relief valve may be formed in the base 6 of the upper ThermoCell body 5 and has its lower end protruded slightly out of the lower surface of the base 6 and its upper end located on the upper surface of the base 6; the seal member 17 of the residual pressure relief valve may adopt a slimmer shape to fit directly below the lower end of the channel 25 of the base 6 and is kept in place by a keeper such as three or more L-shaped bars extended downward from the base 6. It is further appreciated that other types of pressure relief valves that can relieve the pressure or steam in the chamber 34 of the ThermoCell pump 15 after the pressure therein has decreased to a predetermined value can be used to replace the residual pressure relief valves described above. It is further appreciated that two or more such pressure relief valves, which may start relieving the pressure or steam in the ThermoCell pump 15 when the pressure therein decreased to different predetermined values, may be used for the ThermoCell pump 15 to improve the performance of the ThermoCell pump. It is further appreciated that the pressure in the ThermoCell may be relieved by the use of a heat exchanger, such as cooling coil in the fluid passageway between the brew basket and filling valve 33 or improved cooling in the brew basket 81, to cause the steam to condense thereby lowering the pressure in the brew basket, the passage way and the ThermoCell.

As discussed earlier, the filling valve 33 plays a central role in the generation and delivery of the multiple pressure pulses by the ThermoCell pump 15. Specifically, it determines the amount of water that can flow from the reservoir 2 into ThermoCell 34 to replace the air originally in the ThermoCell when water is added into the reservoir, i.e. it determines the initial filling of the ThermoCell. It also determines how quickly and how well the openings 6a and 6b is closed, which is critical for the pressure to build up in the ThermoCell as the heater 14 heats the water and produce steam in the ThermoCell. The filling valve also determines when to open the openings 6a and 6b to cause the Thermo-Cell to be refilled, thus preparing the ThermoCell pump to generate and deliver the $2^{nd}$ pressure pulse. These functions and related structures and specifications of the filling valve will be discussed in detail below.

FUNCTION I—Initial Filling of ThermoCell Pump with Water from the Reservoir. The filling valve 33 should allow the water in the reservoir 2 to flow into and fill ThermoCell pump 15 through openings 6a and 6b. Since the outlet port 40 is at the lowest portion in the chamber 34 of the ThermoCell pump, it is quickly covered by water as water flows into the chamber 34. This causes the air originally in the chamber to be trapped between the outlet port and the opening 6a and may prevent water from flowing into the chamber unless the trapped air can be released into the reservoir 2 or atmosphere. The trapped air may be released via openings 6a and 6b if they are large enough to allow to flow out as water flows into the chamber 34. The air may also be released quickly enough via channel 25 if the channel is open enough and the upper end of the channel is a significant distance above the opening 6a, especially if the channel is extended above the water surface in the reservoir. It is also possible to have a venting valve similar to the venting valve 127 shown in FIG. 5 connected or formed in the upper ThermoCell body 5 to release the trapped air. Typical dimensions for ring-like opening 6a are approximately 0.4 to 8 cm, preferably approximately 0.8 to 4 cm, in outer-ring diameter and approximately 0.1 to 3 cm, preferably approximately 0.2 to 1 cm, in ring width; the typical predetermined distance, which defines the dimension for opening 6b, is approximately 0.05 to 1 cm, preferably approximately 0.07 to 0.4 cm. Although it is possible to have the chamber 34 of the ThermoCell pump nearly completely filled with water from the reservoir 2, it is found that the ThermoCell pump can function satisfactorily even if half of the air in the chamber 34 remains in the chamber after the initial filling. The air remained in the chamber after the initial filling of the chamber will be delivered out of the outlet 37 with the steam, and as a result will have little lasting impact in the performance of the ThermoCell pump. The remaining air in the chamber, however, does affect how the filling valve closes the openings 6a and 6b, which are discussed below.

FUNCTION II—Closing of the Opening 6a by the Filling Valve for Building Up Pressure in the ThermoCell Pump. To allow steam pressure to build up in the chamber 34 of the ThermoCell pump 15 as heater 14 heats the water and generates steam therein, the filling valve 33 must be able to close the openings 6a and 6b timely and properly. For ThermoCell pump 15 of FIG. 1, there are two possible forces that may lift the valve body, which includes the upper and lower valve bodies and all the parts (e.g. valve seal 8 and seal member 17) that move together with the upper and lower valve bodies, upwards against the base 7, thus sufficiently closing the opening 6. One of the forces is the buoyancy force of the valve body in water; the other is the upward force exerted to the valve body by the effects of heater 14 heating the water below the valve body. If the combined density is less than water density and the chamber 34 of the ThermoCell pump is filled with water, the valve body will float upwards due to the buoyancy force until the valve seal 8 reaches the base 7, thus sufficiently closing the opening 6a or 6b. If the combined density of the valve body is greater than water density or there is a significant amount of air remain trapped in the chamber 34, the buoyancy force is not enough to lift up the valve body. In this case, the upward force caused by effects of heating the water below the valve body becomes critical in lifting up the valve body, thereby sufficiently closing the opening 6a or 6b. The effects of heating the water below the valve body by heater 14 may include the upward flow of hot water and steam, rising of the water level in the chamber 34 due to the generation of steam bubbles if the chamber was initially not filled with water, bubble power of the steam bubbles below the valve body, and pressure increase as a result of heating. (Note: If the combined density is too much greater than water density or the valve body is too heavy, the force from the effects of heating may be not sufficient to lift up the valve body, thus making it difficult to cause a seal between the valve seal 8 and the base 7. After the opening 6a is sufficiently closed and the heater 14 has heated the water to a certain temperature, the pressure in the ThermoCell pump will start increasing rapidly since amount of steam generated by the heater exceeds the loss of water and steam through the now sufficiently closed opening 6. The increasing pressure causes an increasingly tight seal between the valve seal 8 and the base 7 since the force exerted to the valve body by the pressure is approximately equal to $(P_t \times A_2)$, where $P_t$ represents the steam pressure in the ThermoCell pump at time t and $A_2$ represents the combined area of ring-like opening 6a and cross section of the lower valve body 23 at the opening 6a.

To facilitate the closing of the opening 6a and 6b by seal member 8, one may improve the buoyancy force by using valve body materials with density lower than water or by increasing the degree of filling, defined as the ratio of water volume in chamber 34 right after filling to chamber volume. Other ways to increase the buoyancy force include optimizing the shape of the valve body, reducing the weight of the valve body, or/and reducing the distance the valve body needs to move to close the opening 6a or 6b (i.e. reduce the predetermined distance). To improve the buoyancy force by increasing the degree of filling, however, generally means the use of a larger opening 6b, thus a larger predetermined distance. As a result, certain compromises must be made between the buoyancy force and the predetermined distance. It was found that a predetermined distance between approximately 0.03 to 0.5 cm, preferably 0.07 to 0.25 cm, gives the acceptable result for the closing of the opening 6a and 6b. The valve body may be designed and dimensioned to improve the force from the heating of the water by use of convex-shaped bottom, higher diameter to height ratio, and a generally symmetric structure.

FUNCTION I—Refilling of the ThermoCell Pump with Water from the Reservoir The filling valve 33 must allow the water in the reservoir 2 to refill the chamber 34 of ThermoCell pump 15 after the water and steam in the pump has been delivered. The refilling of the ThermoCell Pump is characterized by three parameters, the Lag Time that is the time interval between the moment that the seal member 17 of the residual pressure relief valve 16 opens the channel 25 and the moment that the filling valve opens, the Filling Time that defines the time it takes to complete the filling action of the chamber 34 of the ThermoCell pump, and the degree of filling that is the ratio of the water volume in the chamber 34 after the filling action to the chamber volume.

Short Lag Time is preferred in most situations, especially when time is of concern. To show what determines the length of the Lag Time, let us look at the operation of the ThermoCell pump. After the filling valve 33 closes the opening 6a, the pressure in chamber 34 increases as heater 14 heats the water, which pressure delivers the hot water and later the steam to the closed brew basket 81 and forces the water and steam through the flavor-containing materials. After all the hot water has left chamber 34, the pressure starts decreasing since no more steam is generated and the hot water and steam continues to be forced out of the brew basket 81 by the pressure. After the pressure has decreased to $P_{residual}$ the seal member 17 of the residual pressure relief valve opens the channel 25, thus quickly relieving the pressure in the chamber to a certain pressure, $P_{refill}$. $P_{refill}$ is approximately equal to $$(W_2/A_2 + h_2)$$

where $W_2$ is approximately the weight for the part of the valve body below the lower surface of the base 7 when the filling valve is in closed position, $h_2$ is the water head above the valve seal 8, and $A_2$ represents the combined area of ring-like opening 6a and cross section of the lower valve body 23 at the opening 6a. The filling valve opens the openings 6a and 6b when the pressure in the chamber 34 reaches $P_{refill}$. The Lag Time is, therefore, primarily determined by $P_{refill}$, the flow resistance of the channel 25 and $P_{residual}$.

The higher the $P_{refill}$, the shorter the Lag Time (Note: The flow resistance of the channel 25 and $P_{residual}$ has been discussed earlier and will not be discussed here). For a ThermoCell pump of normal size and wattage for delivering and forcing water or steam through fluid permeable materials such as drip coffee grounds, tea, espresso grounds, herbs or water filtration materials, $W_2$ is approximately 1 to 200 grams, preferably 5 to 50 grams, although lighter or heavier $W_2$ is possible for very small or large ThermoCell pumps; $A_2$ is approximately 0.1 to 40 $cm^2$, preferably approximately 0.4 to 10 $cm^2$. $P_{refill}$ can be designed, with proper selection of $W_2$ and $A_2$, to be approximately 0.001 to 1 $kg/cm^2$, preferably approximately 0.01 to 0.5 $kg/cm^2$.

It is appreciated that $P_{refill}$ may be designed to be as high as $P_{residual}$, i.e. as high as 1 $kg/cm^2$ for a ThermoCell pump for delivering and forcing water or steam through permeable materials of low flow resistance or as high as 5 $kg/cm^2$ for a ThermoCell pump for delivering and forcing water or steam through permeable materials of high flow resistance. In such cases, the filling valve, in addition to functioning as the filling valve 33 described above, can also function as the residual pressure relief valve 16 described above to relieve the residual pressure in the ThermoCell pump, making it possible to remove the residual pressure relief valve 16 and simplify the structure of ThermoCell pump. To do so, small $A_2$ and/or large $W_2$ are normally necessary. Large $W_2$ may require the chamber 34 to be large to house the valve body, which may mean a large or oversized ThermoCell pump; large $W_2$ may also cause difficulty in the Closing of the Filling Valve, especially in case that the buoyancy force is not sufficient to lift up the valve body. Small $A_2$ may cause difficulty in the Initial Filling of the ThermoCell Pump, increase the Filling Time, decrease the Degree of Filling, etc. It is appreciated that small $A_2$ and/or large $W_2$ are acceptable in certain applications for the ThermoCell pump, such as in applications where the flow resistance down stream the outlet 37 of the ThermoCell pump is small enough to allow the steam therein to decrease quickly or in applications where large ThermoCell pumps are acceptable.

The Filling Time and the Degree of Filling are interrelated, and are primarily determined by the volume and shape of the chamber 34 of the ThermoCell pump 15, the water head above the valve seal 8, the flow resistance through the reservoir valve (not shown) in the outlet 20 of the removable reservoir 2, the outlet 21 of the chamber 3, the openings 6a and 6b of the filling valve 33, and the space between the inner wall of the pump bodies 5 and 12 and the exterior surface of the valve body, the driving force for drawing the water from the reservoir 2 into the ThermoCell pump, the temperature of the ThermoCell pump at the time of refilling, and heat capacity and heating power of the ThermoCell pump. The driving force for drawing the water into the chamber 34 is the difference between the pressures inside and above chamber 34. When the pressure in the chamber 34 decreases below $P_{refill}$, the valve body opens the openings 6b and 6a and subsequently rests on base 7 through the radial wings 4 of the upper valve body 22. When the water from the reservoir enters the chamber, the steam in the chamber quickly condenses into water and creates a vacuum in the chamber, which causes large driving force and quickly draws water from the reservoir into the ThermoCell pump, thus making the Refilling Time very short. It is suspected that the sound produced during the refilling is a result of the vacuum and quick flow of water into the chamber 34. Generally, the lower are the temperature at the time of refilling, the heating capacity and the heating power of the ThermoCell pump, the higher are this vacuum and the Degree of Filling. The temperature at the time of refilling may be decreased by using residual pressure relief valve 16 that can relieve the residual pressure very quickly, by designing the residual pressure relief valve 16 and filling valve to have high $P_{residual}$ and $P_{refill}$, by increasing heat capacity of the lower ThermoCell body 12 or/and by turning the heater 14 off via thermostat 11. Smaller volume of chamber 34, smaller wattage of the heater 14, lower flow resistance, large water head above the valve seal 8, larger diameter to height ratio of the chamber 34, and lower pump temperature at the time of refilling generally improves the Filling Time and Degree of Refilling. (Note: Given the same volume, the chamber 34 with larger diameter to height ratio enables shorter upper and lower pump bodies.)

The possible materials for the valve seal 8 and the seal member 17 include rubbers or elastomers such as silicone, natural rubber and polyisoprene, plastics such as Teflon, and other temperature-resistant materials that can form water-tight seal. The possible materials for the upper and lower valve bodies include temperature-resistant materials such as polypropylene, nylon, polysulfone, and even certain low-density nonpolymeric materials like aluminum. Special processing or forming methods such as enclosing air or other lighter compounds into the above possible materials may be used to reduce material density. Light materials such as polyethylene and polymeric foam may be attached to the certain parts of the valve body to lower the combined density of the valve body.

Figure 6:
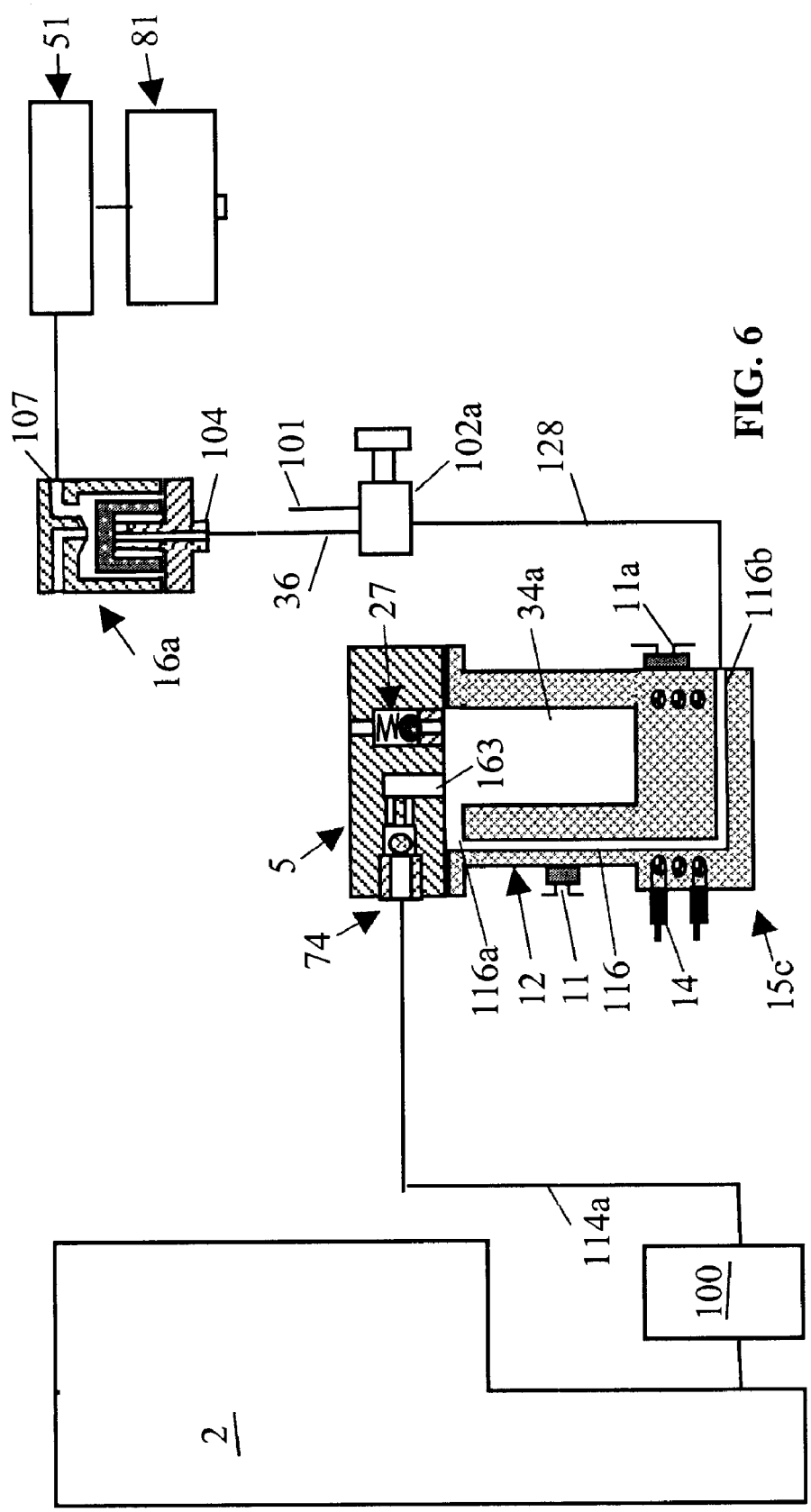
FIG. 6 is a side elevation, sectional, partially-schematic view of a another modified version of ThermoCell 15 of the embodiment of FIG. 5.

It is appreciated that filling valve 33 may adopt other configurations such as those shown in FIG. 4, where the filling valve 33 is combined with safety valve 27, in FIGS. 5 and 6 where the filling valve 33 communicates the ThermoCell pump 15b or 15c to a mechanical pump 100, and in FIG. 9 where the filling valve 33 comprises only the valve seal 8 and upper and lower valve bodies. (The filling valve 33 will be further described during the discussions of FIGS. 4, 5, 6 and 9.) Another such example (not shown) is that the filling valve comprises a lower valve body and a valve seal attached to the top surface of the valve body for closing the opening 6a. The lower valve body is supported at its bottom by a support member such as a cross mounted between the lower and upper pump bodies instead by radial wings 4 and base 7. It is further appreciated that other types of valves that can allow sufficient Initial Filling of Thermo-Cell Pump with water from the reservoir 2, sufficient Closing of the Opening 6a and sufficient Refilling of the ThermoCell pump may be used as the filling valve 33.

The safety valve 27 (FIG. 1) located in the lower valve body 23 is for relieving the pressure inside ThermoCell pump after the pressure has exceeded to a predetermined pressure $P_{safety}$, which is thereafter called safety pressure. It comprises a safety valve chamber 29, a first channel 32 for connecting the valve chamber 29 to chamber 9, a seal disc 31 for sealing the first channel, a compressed spring 30, and a lock member 26 having a central opening connecting the valve chamber 29 to the removable reservoir 2 via opening 28, outlet 20 and outlet 21. The lock member 26 keeps the seal disc 31 and loaded spring 30 in position within the valve chamber 29, therefore ensures that the first channel 32 remains closed by seal disc 31 until the pressure in chamber 9 or the ThermoCell pump 15 reaches a pressure high enough, i.e. $P_{safety}$. At pressure above $P_{safety}$ the force exerted onto the seal disc by the pressure exceeds the force exerted to the seal disc by the loaded spring, thus opening the first channel 32 and allowing the pressure in the ThermoCell pump to be relieved in the form of steam into the reservoir 2.

It is appreciated that the safety valve 27 may be located anywhere as long as the first channel 32 is connected to the interior of the ThermoCell pump. Such examples are shown in FIGS. 5 and 6 where the safety valve 27 is located in the upper ThermoCell body 5 and in FIG. 9 where the safety valve is located between the outlet 37 of the lower ThermoCell body 12 and the brew head 51. It is also appreciated that the safety valve 27 may adopt other configurations or structures. For example, the seal disc 31, spring 30 and lock member 26 may be replaced by a seal body of certain weight on the top-of channel 32 to seal the channel under normal conditions and to open the channel when the pressure inside the ThermoCell pump exceeds a predetermined value that is large enough to lift the seal body from the top of channel. It is also appreciated that other types of safety valves for pressure hazard, including those known in small or major home appliances, may be used to replace the safety valve 27 in the ThermoCell pumps. It is further appreciated that the safety valve 27 is optional for the ThermoCell pumps and may be removed if pressure hazard is not a concern or can be mitigated by other means.

A modified version of the ThermoCell pump 15 of FIG. 1 is shown in FIG. 4. The major differences between the ThermoCell pump 15 of FIG. 1 and ThermoCell pump 15a of FIG. 4 include the location of the residual pressure relief valve and the addition of steam generating system 98. The residual pressure relief valve 16a of FIG. 4 is located in the flow path between the outlet 37 and the brew head 51. It comprises cylindrical seal member 17 having recess 18 at its bottom center portion similar to that of the FIG. 1 to collect steam or air and stabilize the seal member, thus facilitating the sealing of the channel 25 by the seal member, a upper body 106 having a closed chamber 111 for housing the seal member and channel 25 having one end protruded out slightly into the chamber 111 and positioned at the top center portion of the chamber for forming a seal with the seal member and the other end in communication with the water reservoir or atmosphere, a lower body 109 attached water tight to the upper body and having an inlet 104 connected to the outlet 37 through the fluid switch 102 and conduit 36 and an extension tube 110 extended into the recess 18 of the seal member, and a fluid outlet 107 connected to the brew head 51. The extension tube 110 and the recess 18 of the seal member 17 are so designed that the fluid flowing out of the extension tube can generate sufficient upward force onto the seal member 17 as a result of the speed and/or pressure of the fluid. These upward force alone, or combined with the buoyancy force of the seal member, pushes the seal member upward against the channel 25 and close the channel. An opening 105 is formed on the side wall at the top portion of the extension tube to avoid any potential blockage in the pathway between the inlet 104 and the chamber 111. The distance between the lower end of the channel 25 and the seal member 17 of the valve 16 in its open position needs to large enough to avoid clogging by foreign solid materials and small enough to minimize the upward movement of the seal member needed to close the channel for facilitating the sealing of the channel. This distance is normally about 0.02 to 0.7 cm, preferably about 0.05 to 0.3 cm. To quickly relieve the pressure or steam in the ThermoCell pump after the pressure therein reaches $P_{residual}$, the channel 25 is designed to have small flow resistance, which is primarily determined by the structure and dimension of the channel.

Like the residual pressure relief valve 16 of FIG. 1, the residual pressure relief valve 16a functions to relieve the pressure in the ThermoCell pump after the pressure therein has declined to a predetermined pressure, $P_{residual}$. $P_{residual}$ is mostly determined by the weight ($W_1$) of the seal member 17 and the size or area ($A_1$) of the opening at the lower end of the channel 25 which is in contact with the seal member, and can be expressed approximately using the following equation:

$$P_{residual} = W_1/A_1$$

where $A_1$ is in cm² and $W_1$ in kilograms. When the pressure in the ThermoCell pump is lower than $P_{residual}$, the pressure force applied to the seal member 17 is smaller than the weight ($W_1$) of the seal member and the seal member will fall off the lower end of the channel 25 and opens the channel if there is no other force exerted onto the seal member. When the pressure in the ThermoCell pump is higher than $P_{residual}$, the pressure force to keep the seal member attached to the lower end of the channel 25, i.e. keep the channel closed. Obviously, one can choose any specific $P_{residual}$ for the apparatus 1 by changing either the weight ($W_1$) of the seal member 17 and the area ($A_1$) of the opening at the lower end of the channel 25. It should, however, be noted that certain properties such as hardness and elasticity and surface roughness of the seal member 17, the shape and structure of the seal member 17, the shape and structure of the opening at the lower end of the channel 25, especially any upward force exerted to the seal member such as the force from the fluid flowing out of the extension tube 110 and buoyancy force, etc. may have significant impact on when the seal member 17 will open the channel 25, i.e. on the value of $P_{residual}$. For a ThermoCell pump of normal size and wattage for delivering and forcing water or steam through low flow resistance materials such as drip coffee grounds, tea or coarse water filtration materials, $W_1$ may range from approximately 0.1 to 200 grams, preferably approximately 0.5 to 50 grams, although lighter or heavier $W_1$ is possible for very small or large ThermoCell pumps; $A_1$ may range from approximately 0.001 cm² to approximately 1 cm², preferably approximately 0.004 to 0.2 cm²; a combination of $W_1$ and $A_1$ is normally selected to result in $P_{residual}$ of approximately 0.01 kg/cm² to approximately 5 kg/cm², preferably approximately 0.05 to 2 kg/cm². For a ThermoCell pump of normal size and wattage for delivering and forcing water or steam through high flow resistance materials such as espresso grounds or fine water filtration materials, $W_1$ and $A_1$ can be designed to have higher $P_{residual}$, such as approximately 0.1 to 10 kg/cm². The effects of the residual pressure ($P_{residual}$) on the brewing process and the resulting beverages will be shown later in FIGS. 8a to 8c.

It is appreciated that the residual pressure relief valve 16a or any of its components may have different structure, configurations or shape. For examples (not shown), the seal member 17 may comprise a plastic (such as polypropylene) body having the recess 18 at the its bottom center portion and an rubber or elastomer seal disc attached to the top of the plastic body for assisting the seal against the lower end of the channel 25. The outlet 107 may be formed at the lower body 109 to avoid any possible stagnant water in the chamber 111. A spring may be placed between the seal member 17 and the lower body 109 or in the recess 18 for reducing the weight of the seal member. The upper body 106 or lower body 109 may be part of the brew head 51 or attached to the brew head to reduce the number fluid connections in the assembly process.

The steam generating system 98 of the ThermoCell pump 15a in FIG. 4 comprises a fluid inlet 98a located near the upper portion of the chamber 34 for steam and water in the chamber, a steam outlet 98d connected to a steam utilization device 103 via a steam conduit 101 and a fluid switch 102, fluid channel 98b connecting the fluid inlet 98a to steam outlet 98d, and water prevention member 112 for minimizing the amount of water that can enter into the fluid channel 98b, thus ensuring that the steam exiting the steam outlet 98d is dry or almost dry. The steam utilization device 103 may be a milk frothier for frothing milk for the preparation of espresso drinks like latte and cappuccino, a steam warming device for heating gas, solid or liquid, a steam mixer for heating, stirring or dissolving liquid-syrup or liquid-solid mixtures, or simply a steam nozzle. The fluid switch 102 is similar to the known fluid switches such as those used in espresso machines, and it comprises a first position in which it opens the passageway between the outlet 37 of the lower ThermoCell body to the inlet 104 of the residual pressure relief valve 16a and a second position in which it opens the passageway between the steam outlet 98d of the lower ThermoCell body to the steam utilization device 103. When the passageway between the steam outlet 98d and the steam utilization device 103 is open (switch 102 in its second position), it is noted that as steam bubbles are produced at the bottom 39 of the lower ThermoCell body 12 by the heater 14 the water in the chamber 34 is pushed upwards by the steam bubbles, causing dramatic increase in the effective water volume. Without the water prevention member 112, up to half of the water in the chamber 34, or sometimes even more depending on the diameter and structure of the chamber, may be pushed through the channel 98 and out of the water utilization device 103 before the steam reaches the device as a result of the dramatic increase in the effective water volume. The water prevention member comprises a super-hot channel 98c that is formed normally near the heater 14 and away from the water in the chamber 34. The super-hot channel 98c is heated to higher temperatures than the bottom 39 of the lower ThermoCell body 12 by the heater 14 during the steam generation process. As a result of the higher temperature at the super-hot channel 98c than at the bottom 39, when the water in the chamber 34 overflows the fluid inlet 98a due to the generation of steam bubbles at the bottom 39 and reaches the super-hot channel 98c, the water becomes quickly evaporated there and generates in the channel 98 steam pressure higher than the pressure of the steam bubbles produced at the bottom 39, thus minimizing or even preventing the water in the chamber 34 from entering the channel 98. To further increase the pressure in the super-hot channel 98c, it is preferred that the flow resistance down stream of the channel 98c is more restricted than the flow resistance up stream of the super-hot channel 98c. This may be simply achieved by making the diameter of at least a small section of the channel down stream the super-hot channel 98c smaller than the diameter of the channel up stream the super-hot channel 98c.

It is appreciated that the water prevention member 112 can be other means such as a hydrophobic membrane or membrane device positioned at the fluid inlet 98 that is located at the top of the chamber 34. The hydrophobic membrane or membrane device allows steam or air to pass through but prevents water to pass unless the water is pressurized above the water break-through pressure of the hydrophobic membrane. It is also appreciated that the fluid inlet 98a may be moved to the highest position to reduce the amount of water that is forced out of the steam outlet 98d prior to steam. It is also appreciated that the fluid inlet 98a may be moved to the lower portion or even near the bottom of the chamber 34 if the water prevention member uses the super-hot channel 98c is effective enough. With the fluid inlet 98a near the bottom, the ThermoCell pump can deliver hot water through the fluid inlet 98a, channel 98, steam outlet 98d, conduit 101, fluid switch 102 and out of the steam utilization device 103 (The thermostat 11 is used for control the hot water delivery and the thermostat 11a for steam delivery.). It is further appreciated that the brew head 51, brew basket 81 and even the residual pressure relief valve 16a may be replaced with a water purification device to make hot purified water or simply a hot water faucet or outlet to make hot water. It is further appreciated that the outlet 37 and the parts downstream can be removed, thus making the ThermoCell pump 15a a dedicated pump for generating pressurized steam.

The other parts of the ThermoCell pump 15a of FIG. 4 are substantially similar to the corresponding parts in Thermo-Cell pump 15 of FIG. 1. The filling valve comprises the lower valve body 99, the seal member attached to the top of the lower valve body, the upper valve body 22 having four radial wings 4 rested on the heat insulator 97 that is attached to the top surface of the base 7, and connector 111 for connect the upper valve body to the lower valve body. The safety valve 27 comprises the inlet channel 32 and the seal disc 31 and spring 30 in safety valve chamber 29 for closing the channel 32 when the pressure in the ThermoCell pump is below $P_{Safety}$. Both the filling valve and safety valve here performs the same functions as those described earlier for the ThermoCell pump 15 of FIG. 1. The heat insulator 97 is attached to the base 7 for reducing heat conduction from the chamber 34 through the base 7 into water in the reservoir, thus minimizing the heating of the water in the reservoir and facilitating the refilling of the chamber 34 with water from the reservoir. (Note: It is found that cold water refills better than hot water.) This heat insulator is found especially useful when the upper ThermoCell body is made of metal such as aluminum or/and the ThermoCell pump is used to generate steam or make espresso type drinks.

To use ThermoCell pumps 15 or 15a of FIGS. 1 or 4 to produce pressure pulses, each comprising a hot water pulse and a steam pulse, for making beverages, one simply fills the reservoir 2 with water. The water in the reservoir flows into and fills the ThermoCell 34. The heater 14 heats the water in the ThermoCell and produces pressurized steam therein. The pressure in the ThermoCell, in combination with buoyancy force, fluid flow, steam bubble power and/or other possible forces, causes the filling valve 33 to close the openings 6a and 6b and the residual pressure release valve 16 or 16a to close the channel 25, and forces the hot water (as the water pulse) out of the outlet 37 and through the conduit 36 and the flavor-containing materials (not shown) in brew basket 81 sealed to the brew head 51. After the water level in the ThermoCell reaches the outlet port 40, the steam (as the steam pulse) is delivered into the brew basket and forced through the flavor-containing materials, drying and essentially re-roasting the flavor-containing materials to create additional flavor and aroma. It should be noted that there sometimes is steam in the water pulse and water in the steam pulse.

As the water and steam are forced through the flavor-containing materials, the pressure in the brew basket and thus in the ThermoCell will start to decrease. It should be noted that the condensation of the steam in the brew basket 81 and the fluid passageway between the brew basket and filling valve 33, due mostly to the heat loss to surrounding environment (air, water, parts, etc.), also causes the pressure in the brew basket and the ThermoCell 34 to decrease. After the pressure in the ThermoCell decreases to $P_{residual}$, the residual pressure relief valve opens the channel 25, thus quickly relieving the pressure in the ThermoCell. It should be noted that the pressure in the brew basket is also relieved by the residual pressure relief valve, unless a direction valve or other restriction is placed in the passageway between the brew basket and the residual pressure relief valve. After the residual pressure relief valve relieves enough steam pressure through the channel 25 and the pressure in the ThermoCell reaches $P_{refill}$, the filling valve 33 opens the openings 6a and 6b and the water from the reservoir 2 quickly fills the ThermoCell. The quick filling is probably due to the vacuum caused by the condensation of steam in ThermoCell when the steam in the ThermoCell meets the water from the reservoir. The re-filling of the ThermoCell 34 with water from the reservoir completes the first pressure pulse. The duration of the pressure pulse, which is the sum of the duration of the hot water pulse and the steam pulse, is determined primarily by the volume of the ThermoCell, the wattage of the heater 14, the flow resistance through the flow passageway, the flavor-containing materials and the filter, the residual pressure relief valve 16, the filling valve 33, the position and size of the outlet port 40 and outlet channel 49.

With the ThermoCell re-filled with water, the heater 14 again heats the water in ThermoCell and produces pressurized steam therein. The process continues and repeats as described above until the reservoir 2 becomes empty or the brewing process interrupted by the user. (Note: The operation for apparatus 1 will be described in detail after we finish the describing the rest of the apparatus.)

ThermoCell pump 15a of FIG. 1 can also produce dry steam for use in the steam utilization device 103. For example, to produce dry steam for making latte, one turns switch 102 to connect the steam outlet 98d to the steam utilization device. Fill the reservoir 2 with water, which flows pass the filling valve 33 and fills ThermoCell 34. The heater 14 heats the water in the ThermoCell and produces pressurized steam therein. The steam pressure in the ThermoCell, in combination with buoyancy force, upward fluid flow, steam bubble power and/or other possible forces, causes the filling valve 33 to close the openings 6a and 6b and forces the steam in the ThermoCell through the fluid inlet 98a, water-prevention member 112, steam outlet 98d and the conduit 36 to the steam utilization device, where the steam is used to froth milk or the mixture of milk and espresso. To make a cup of latte, one may instruct the apparatus to deliver first the steam to the steam utilization device to froth a predetermined amount of milk in cup 114 and to deliver later one or two hot water pulses through the espresso grounds in brew basket 81, thus brewing one or two shots of espresso directly into the cup 114 containing the frothed milk. Alternatively, one may instruct the apparatus to deliver first one or two hot water pulses through the espresso grounds in brew basket 81, thus brewing one or two shots of espresso into the cup 114 containing cold milk to form a mixture of espresso and milk and to deliver later the steam to the steam utilization device to froth the mixture. After all of the water in the ThermoCell is evaporated, the temperature of the lower ThermoCell body increases rapidly, causing the thermostat 11a to turn off the heater 14. The filling valve opens and the water from reservoir refills the ThermoCell after nearly all the steam in the ThermoCell is delivered through the steam outlet 98d and the pressure inside the ThermoCell drops below $P_{refill}$.

The ThermoCell pumps 15 of FIG. 1 and 15a of FIG. 4 discussed above have several drawbacks, including that the ThermoCell pump must be placed below the bottom of the water reservoir and that it is difficult to control the exact amount of water delivered into the chamber 34 of the ThermoCell pump. FIG. 5 shows the modified version of the ThermoCell pump 15 of FIG. 1 and 15a of FIG. 4 that addresses these drawbacks. The modified ThermoCell pump 15b comprises direction valve 74, upper ThermoCell body 5 having the safety valve 27 and a venting valve 124 formed in it, lower ThermoCell body 12, a mechanical pump 100 for delivering water from the reservoir 2 through conduit 114 and the direction valve 74 into the chamber 34, and the residual pressure relief valve 16a having outlet 107 connected to brew head 51 (not shown) as shown in FIG. 4. The lower ThermoCell body 12, residual pressure relief valve 16a, safety valve 27, and fluid switch 102 are substantially the same as those in ThermoCell pump 15a of FIG. 4, therefore are not described again.

The mechanical pump can be any type of pump, such as rotary or peristaltic pump, that can deliver the water from the reservoir 2 into the chamber 34. The direction valve 74 comprises a chamber 120 having a plurality of openings 121 at one end for communicating with the chamber 34 through chamber inlet 163 and another opening 1118 at the opposite end for receiving water from the mechanical pump 100 through conduit 114a and an elastomer or rubber seal ball 119 in the chamber. The seal ball 119, opening 118 and openings 121 are so constructed that the seal ball 119 can close the opening 118 but not the openings 121, therefore allowing fluid flow from mechanical pump 100 into the chamber 34 but preventing the opposite flow. The venting valve 124 comprises a seal disc or ball 126 and a chamber 122 having one opening 123 at one end for communicating with the reservoir 2 or atmosphere and a retainer 127 having at least one opening at the opposite end for keeping the seal ball or disc in the chamber and for communicating with chamber 34. The seal disc or ball 126 and the chamber 122 are so constructed that the upward air flow out of the valve as a result of the mechanical pump 100 pumping water into the chamber 34 is not sufficient to lift up the seal disc or ball, but the buoyancy force due to the presence of water in chamber 122 or/and the steam pressure or bubble power generated in the chamber by heater 14 are sufficient to lift up the seal disc or ball and subsequently to close the opening 123. The seal disc or ball 126 has a density close to, preferably smaller than, water density.

To use the ThermoCell pump 15b to produce hot water pulses and steam pulses for making beverages, the mechanical pump delivers a predetermined amount of water from the reservoir 2 through conduit 114 and the direction valve 74 into the chamber 34. The air in the chamber 34 flows out through the venting valve 124 as water is pumped into the chamber. The fluid switch is turned to its first position to connect conduit 36 to the brew head 51. After the completion of water delivery into the ThermoCell 34 (i.e. chamber 34), the mechanical pump is turned off or becomes inactive, either automatically or manually. The heater 14 heats the water delivered into the ThermoCell by the mechanical pump and generates pressurized steam in the ThermoCell. The steam pressure in the ThermoCell closes the direction valve 74 and the venting valve 124 and forces first the hot water (as the water pulse) and later steam (as the steam pulse) in the chamber 34 through the outlet 37, conduit 36, residual pressure relief valve 16a, and through the brew basket 81 sealed to brew head 51. It should be noted that there sometimes is steam in the water pulse and water in the steam pulse. After the pressure in the ThermoCell decreases to $P_{residual}$, the residual pressure relief valve 16a opens channel 25 and the pressure is quickly relieved. The mechanical pump 100 then delivers another predetermined amount of water from the reservoir 2 into the ThermoCell 34 for producing another hot water pulse and steam pulse. The above process is summarized in FIG. 8b, which will be discussed later.

To use the ThermoCell pump 15b to generate steam for use in the steam utilization device 103, the mechanical pump delivers a predetermined amount of water from the reservoir 2 through conduit 114 and the direction valve 74 into the chamber 34. The fluid switch is turned to its second position to connect conduit 101 to the steam utilization device 103. After the completion of water delivery into the ThermoCell 34 (i.e. chamber 34), the mechanical pump is turned off or becomes inactive, either automatically or manually. The heater 14 heats the water delivered into the ThermoCell by the mechanical pump and generates in the ThermoCell pressurized steam, which is forced under its own pressure through the channel 98, conduit 101 and to the steam utilization device 103.

A modified version 15c of the ThermoCell pump is shown in FIG. 6. The parts, including the reservoir 2, the mechanical pump 100 and the residual pressure relief valve 16a, are the same for the ThermoCell pumps 15b and 15c. The direction valve 74 and safety valve 27 has the same design as those in FIG. 5, therefore will not be discussed again. The main difference between the ThermoCell pumps 15b and 15c is that ThermoCell pump 15c relies on the mechanical pump 100 to deliver hot water through the brew basket 81 sealed to brew head 51 or to deliver steam to the steam utilization device 103, while ThermoCell pumps 15b relies on the steam pressure generated by heater 14 to do so. ThermoCell pump 15c comprises the lower ThermoCell body 12 having chamber 34a, a fluid heating channel 116, a channel inlet 116a and a channel outlet 116b leading to fluid switch 102a via fluid conduit 128, the mechanical pump 100 for delivering water from the reservoir via conduit 114 into and through the chamber 34a, channel 116 and subsequently through the brew basket 81 sealed to brew head 51 or the steam utilization device 103, the filling valve 33 for allowing the flow into the chamber 34a and preventing the opposite flow, and the upper ThermoCell body 5 with the safety valve 27 formed in it.

As shown in FIG. 6, the fluid switch 102a can be switched between-a first position in which the fluid from the outlet 116b is directed to a water utilization device such as the brew basket 81 sealed to brew head 51 and a second position in which the fluid from the outlet 116b is directed to the steam utilization device 103 (not shown in FIG. 6, but as depicted in FIG. 4). When the fluid switch 102a is switched into its first position, the lower pump body, thus of the chamber 34a and heating channel 116, is controlled to a lower temperature by thermostat 11 so that the water from the heating channel 116 is not overheated for the water utilization device; When the fluid switch 102a is switched into its second position, the lower ThermoCell body is controlled to a higher, temperature by thermostat 11a so that all, or nearly all the water becomes evaporated in chamber 34a and heating channel 116.

The chamber 34a functions as a pre-heating chamber to preheat the water when the mechanical pump 100 delivers the water from reservoir 2 quickly through the chamber 34a, heating channel 116 where the water is heated to a predetermined temperature, conduits 128 and 36 and the brew basket 81 sealed to brew head 51, and functions as a steam generator to produce steam for drying or activating the contents in the water utilization device or for use by the steam utilization device 103 after the mechanical pump 100 stops. The chamber 34a can be large if the amount of steam required by the water utilization device or the steam utilization device is great, or can be as small as the fluid channel 116 if the amount of steam required is small. It is even possible to extend the inlet 163 on the upper ThermoCell body 5 down to the bottom of the chamber 34a to further reduce the amount of steam to be produced after the mechanical pump 100 stops.

Like ThermoCell pumps 15a and 15b, ThermoCell pump 15c in FIG. 6 can be used to generate hot water pulses and steam pulses for making beverages or to generate dry steam for heating or mixing liquids and/or solids. When the ThermoCell pump 15c is used to generate hot water pulses and steam pulses for making beverages, the mechanical pump 100 pumps a predetermined amount of water or pumps water for a predetermined length of time (as the water pulse), from the reservoir 2 into and through chamber 34a and heating channel 116, in both of which the water is heated by the heater 14, and through the water utilization device such as the brew basket 81 sealed to brew head 51. After the predetermined amount of water pumped or the predetermined length of time (the water pulse), the mechanical pump stops and the filling valve 33 becomes closed due to the now higher pressure in the chamber 34a. The heater 14 continues to heat the remaining water in the chamber 34a, thus generating pressurized steam, which forces itself through the water utilization device (as the steam pulse), thereby drying and activating the content in the water utilization device. After the chamber becomes dry and the pressure in the ThermoCell decreases to $P_{residual}$, the residual pressure release valve opens and quickly relieves the pressure. The mechanical pump then starts to deliver another water pulse through chamber 34a, heating channel 116 and the water utilization device. When the ThermoCell pump 15c is used to generate dry steam for heating or mixing liquids and/or solids in the steam utilization device 103, the mechanical pump 100 pumps a predetermined amount of water or pumps water for a predetermined length of time from the reservoir 2 into and through chamber 34a and heating channel 116 where the water is heated and evaporated by the heater 14 and to the steam utilization device 103 (see FIG. 4). After enough steam is produced, the pump is turned off.

It is appreciated that the residual pressure relief valve 16a may be removed from both the ThermoCell pumps 15b and 15c (FIGS. 5 and 6) without impacting their ability to produce hot water pulses and steam pulses for extracting the flavor-containing materials. The function of the residual pressure relief valve 16a, as stated earlier, is to quickly relieve the pressure in the ThermoCell pump. For the ThermoCell pump 15b without the residual pressure relief valve, after all the water in the ThermoCell 34 is forced out of the outlet 37 by the steam pressure, the mechanical pump 100 can simply start pumping water from the reservoir 2 to refill the ThermoCell 34 before the pressure in the ThermoCell reaches zero. For the ThermoCell pump 15c without the residual pressure relief valve, after the mechanical pump 100 delivers a predetermined amount of water (as the $1^{st}$ water pulse) through the ThermoCell 34a, heating channel 116 for heating the water to a predetermined temperature, conduits 128 and 36 and through the brew basket 81 sealed to brew head 51, it stops and the heater 14 starts to produce in ThermoCell 34a pressurized steam, which first forces the residual water in the brew basket and later forces itself (as the $1^{st}$ steam pulse) through grounds in the brew basket. Without the residual pressure relief valve to relieve the residual steam pressure in the ThermoCell, the mechanical pump 100 starts to deliver another predetermined amount of water (as the $2^{nd}$ water pulse) through the ThermoCell 34a, heating channel 116, and the brew basket 81 sealed to brew head 51 before the pressure in the ThermoCell reaches zero. This process is summarized in FIG. 8c, which will be discussed later.

Now, let us return to FIG. 1. The outlet 37 of the ThermoCell pump 15 is connected to the brew head 51 and brew basket 81 supported by a brew basket support 46. The brew head and brew basket are sealed to each other water-tight by a gasket seal 82 attached to the underside of the brew head. The gasket seal 82 comprises an inwardly folded top 82a partially received in a circular recess formed on the underside of the brew head and a cylindrical sleeve 82b with its diameter slowly decreasing downward to facilitate the insertion of the sleeve into the brew basket 81. The gasket seal is made of rubber or elastomer and the inwardly folded top 82a and the sleeve 82b are so constructed to enable better seal as the pressure in the brew basket increases. It is appreciated that the outlet 37 of the ThermoCell pump 15 can be connected to water utilization devices other than the brew head/brew basket described above, such as the brew head/filter basket used by any existing espresso machine or a water purification device for making purified hot water.

The brew head comprises an inlet channel 52 connected to the outlet 37 via conduit 36, a brew control system 62 for controlling the extraction time, pressure and temperature of the flavor-containing materials in the brew basket 81, a water distributor chamber 56, a water distributor 84 having a plurality of openings 83 for distributing water in the chamber 56 over the flavor-containing materials in the brew basket, a pair of mounting pins 43 formed on the bottom left of the brew head and inserted into a pair of openings 44 formed on a sturdy brew basket support 46 for rotationally opening and closing the brew head, a downward extension arm 67 having a opening 70 and a button 69 fitting slidingly into the opening 70, and a cavity 64 formed at the underside of the brew head having a spring 63 attached to the bottom of the cavity.

The brew control system 62 comprises a cone-shaped opening 53 having one end connected to the inlet 52 and the other end to the distributing chamber 56, a through opening 60 co-axial with opening 53, and a switch rod 57 received in the openings 53 and 60. The switch rod has a cone-shaped head 54 fitting to the cone-shaped opening 53, a minimum flow channel 55 formed in the head 54 to provide a flow passage between the inlet 52 and chamber 56 when the head 54 closes the opening 53, a seal 58 for forming a water tight seal between the opening 60 and the switch rod, and a knob 61 for turning the switch rod to move it inward or outward through thread 59 formed on the opening 60 and the switch rod. When the switch rod 57 is moved outward, the. flow passage between the opening 53 and the head 54 opens up, thus allowing the hot water in the chamber 34 of the ThermoCell pump to be quickly delivered into and through the flavor-containing materials in the basket 81 under elevated steam pressure. This normally results in lower water temperature, shorter water contact or extraction time, and possibly lower pressure since the water in the Thermo-Cell pump does not have to be heated to high temperature before being forced out. When the switch rod 57 is moved inward, the flow passage between the opening 53 and the head 54 shrinks, thus making the hot water in the chamber 34 to be slowly delivered into and through the flavor-containing materials (not shown) in the basket 81 under elevated steam pressure. This normally results in higher water temperature, longer water contact or extraction time and possibly higher pressure since the water in the Thermo-Cell pump has more time to be heated to high temperature before being forced out.

It is appreciated that the brew control system 62 may be located anywhere between the outlet port 40 of the chamber 34 and the water distributor 84. It is also appreciated that the brew control system 62 and any of its components may adopt different designs and structures. For example, the minimum flow channel 55 may be formed as a slot on the opening 53 or the head 54. It is also appreciated that the brew control system 62 is optional for the apparatus 1 and may be removed from it. It is further appreciated that the brew control system 62 may be replaced by other types of electrically-operated valves such as a solenoid valve that allows the consumer or user to control the flow resistance electronically or digitally.

A cavity 89 is formed near the top right of the brew basket support 46 for receiving a spring 87 and a latch 86. The extension arm 67, button 69, opening 70, cavity 89, spring 87 and latch 86 together forms the brew head locker 68. The latch 86 fits slidingly into the cavity 89 and is attached to the spring 87, which is attached to the bottom of the cavity 89. The extension arm 67 and latch 86 are so designed that when the brew-head is pushed down towards the brew basket 81, the bottom 71 of the extension arm pushes the latch into the cavity 87 and subsequently passes the latch. After the cavity 89 is approximately in line with opening 70 on the extension arm 67, the latch 86 is pushed out into the opening 70 by the spring 87 and becomes caught by the opening 70, thus preventing the brew head from being pushed up by the pressure in the brew basket. A keeping mechanism is built into the opening 70 and the button 69 so that the button will not be completely pushed out of the opening 70. To open the brew head, the user simply pushes the button 69, which in turn pushes the latch 86 into the cavity 89. As soon as the latch 86 is pushed out of the opening 70, the spring 63 is compressed in the cavity 64 by the protrusion 66 on the brew basket support 46, which pushes the brew head up and allows the bottom 71 to pass the latch 86, therefore opening the brew head.

The brew basket 81 comprises a top rim 85 to rest on the brew basket support 46 and to form a water tight seal with the gasket seal 82, a paper-filter seal ring 91 formed around the bottom perimeter area of the brew basket for forming a seal with the bottom perimeter area of a cup-shaped paper filter 90 so that elevated pressure can build up above the paper filter, a plurality of filter support ridges 92 formed at the bottom of the filter basket (refer to FIG. 2) for supporting and preventing the bottom of the cupis shaped filter paper from being ruptured by the pressure above the paper filter, a central opening 93 for discharging the extraction, a plurality of extraction collecting channels 95 formed between the filter support ridges at the bottom of the filter basket for collecting the extraction from the filter paper above and conducting the extraction to the central opening, and a pause & serve valve 79. The cup-shaped paper filter 90 is inserted into the brew basket for receiving the flavor-containing materials (not shown) to be extracted.

The pause & serve valve 79 comprises a rubber seal disc 94 for closing the opening 93, a valve body 75 having a valve opening 77 for discharging the extraction from the central opening 93 of the brew basket, a stem 78 having an enlarged top for connecting the seal disc 94 to the valve body, and a spring 76 for pushing the valve body downward and ensuring that the seal disc 94 closes the opening 93 when the carafe or extraction receptacle (not shown) is not placed below the brew basket.

It is appreciated that the paper filters, including the cup- and cone-shaped, are made for non-pressurized coffee makers like automatic drip coffee makers where water sips through the coffee grounds by gravity and no seal between the paper filter and brew basket exists or is required. The seal between the paper filter and brew basket is, however, found to be very advantageous in achieving the superior taste and/or aroma of the beverages made by the apparatus containing ThermoCell pumps. Inadequate seal between the paper filter and brew basket causes leakage of pressure and steam, thus preventing the building-up of pressure above the flavor-containing materials in the filter paper and the drying and activation of the flavor-containing materials by steam, both of which contribute to the superior taste and/or aroma. The lower pressure above the flavor-containing materials caused by inadequate seal between the paper filter and brew basket may also disrupts the pulsed operation of the ThermoCell pump, which will be discussed later.

The paper-filter seal ring 91 self improves its seal to the bottom perimeter area of the cup-shaped paper filter 90 when the ThermoCell pump delivers water into the brew basket. The cup-shaped filter paper from all manufacturers has numerous folds on its side and such folds extend all the way to the bottom of the filter paper. In existing automatic drip coffee makers, these folds are required since they allow the water in and above the flavor-containing materials in the cup-shaped filter paper to exit the filter paper on the side, thus increasing the filtration area and compensating for the slow filtration rate by gravity. In the new apparatus, such flow of water through the filter paper at the folds is not desired. All the water should be forced by high pressure through the whole depth of the flavor-containing materials above the bottom of the cup-shaped filter paper. The filter-paper seal ring 91 of the brew basket 81 also prevents the flow of water through the filter paper at the folds. To achieve sufficient seal between the filter-paper seal ring 91 and the bottom perimeter area of a cup-shaped paper filter 90, the filter-paper seal ring should be sufficiently wide, normally approximately 0.4 to 2 cm and preferably approximately 0.6 to 1.5 cm.

Figure 7A:
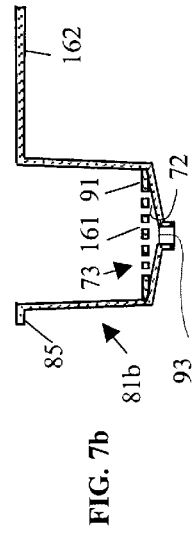
FIGS. 7a and 7b are side elevation, sectional views of modified versions of the brew basket 81 of FIG. 1.
Figure 7B:
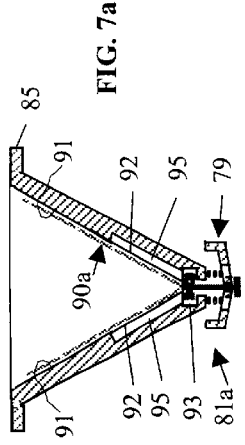

FIGS. 7*a* and 7*b* show two alternative brew baskets 81*a* and 81b. Brew basket 81*a* of the FIG. 7*a* shows a new cone-shaped filter basket for use with the ThermoCell pumps. It comprises a top rim 85 to rest on the brew basket support 46 and to form a water tight seal with the gasket seal 82, a paper-filter seal cylinder 91 adapting the shape of the upper portion of a cone-shaped filter 90a for forming a seal with the upper portion of the cone-shaped filter so that elevated pressure can build up above the paper filter, a plurality of filter support ridges 92 formed at the bottom portion of the cone-shaped filter basket for supporting and preventing the bottom portion of the cone-shaped filter paper from being ruptured by the pressure above the paper filter, a central opening 93 for discharging the extraction, a plurality of extraction collecting channels 95 formed between the filter support ridges for collecting the extraction from the filter paper above and conducting the extraction to the central opening, and a pause & serve valve 79. The cone-shaped paper filter 90a is inserted into the cone-shaped brew basket for receiving the flavor-containing materials (not shown) to be extracted. The paper-filter seal cylinder 91 self improves its seal to the upper portion of the cone-shaped paper filter 90a when the ThermoCell pump delivers water into the brew basket and subsequently wets the cone-shaped paper filter 90a. The pause & serve valve 79 is the same as that shown is FIG. 1, and therefore is not discussed here again. To allow the use of small amount of flavor-containing materials such as coffee grounds or to achieve higher pressure build-up above the cone-shaped paper filter, the cone-shaped filter may be constructed to have the paper-filter seal cylinder 91 extended into the lower portion of the cone-shaped brew basket or have the section of brew basket with the filter support ridges and extraction collecting channels smaller.

Brew basket 81b of the FIG. 7b shows a new cup-shaped filter basket for use with the ThermoCell pumps. It comprises a top rim 85 to rest on the brew basket support 46 and to form a water tight seal with the gasket seal 82, a disc plate 73 attached to the bottom of the brew basket and having numerous through-openings 161 formed on its inner portion and a non-porous paper-filter seal ring 91 on its outer portion for forming a seal with the bottom perimeter area of a cup-shaped filter (not shown) so that elevated pressure can build up above the paper filter, an extraction collecting chamber 95 below the disc plate for collecting the extraction from the openings 161, a central opening 93 for discharging the extraction, and a handle 117, which may be made foldable for easy storage, for helping user carry the brew basket 117. The cup-shaped paper filter is inserted into the brew basket for receiving the flavor-containing materials (not shown) to be extracted. The paper-filter seal ring 91 self-improves its seal to the bottom perimeter area of the cup-shaped paper filter when the ThermoCell pump delivers water into the brew basket and subsequently wets the paper filter. A pause & serve valve similar to the pause & serve valve 79 of FIGS. 1 or 7a may be added to the brew basket 81b to regulate the discharging of extraction through opening 93.

The openings 161 on the disc plate 73 may be made fine enough so that the flavor-containing materials such as coffee grounds can be retained above the disc plate. In this configuration, the disc plate 73 becomes a permanent filter, thus allowing the user to use the brew basket 81b without any paper filter. Since the disc plate 73 is attached to the brew basket 81b, the brew basket has no removable part and may be conveniently used as a scoop for scooping coffee grounds directly from a coffee jar or bag and then place the brew basket into the apparatus, thus saving the consumer the effort to transfer the coffee grounds from the scoop to the brew basket.

It is appreciated that the brew baskets 81, 81a and 81b of FIGS. 1, 7a and 7b, respectively, may adopt different structures and configurations while maintaining the filter-paper seal ring or cylinder intact to ensure sufficient seal between the brew basket and the cup-shaped or cone-shaped filter paper. For example, the opening 93 may be extended by a conduit to a place above the bottom of the filter basket, as shown and will be discussed in FIG. 9. It is also appreciated that the brew baskets may be adapted to receive a prepackaged capsule or cartridge containing flavor-containing materials. It is further appreciated that the brew head 51 may be adapted to receive a prepackaged capsule or cartridge containing flavor-containing materials and to form a water-tight seal between the capsule or cartridge and the brew head without the brew basket.

Besides the safety valve 27, additional safety mechanisms may be included for the apparatus using the ThermoCell pumps. To prevent hot water from spraying or shooting toward the user's face when the user opens the brew head while the apparatus is in operation, a squeeze plate 45 (shown in FIG. 1) is formed or mounted between the pair of mounting pins 43 for squeezing the conduit 36 when the brew head is rotated upwards with the pair of mounting pins 43 as the axis, thereby substantially closing the conduit when the brew head is opened. To enable the squeezing action, the conduit may be made of silicone, either enforced or non-enforced by fibers, or other flexible, heat and pressure resistant materials. To automatically turn off the electricity to the ThermoCell pump when the brew head 51 is open, a first electric switch (not shown) may be mounted somewhere near the brew head to allow it to be turned off by the action of opening the brew head. To automatically turn-off the electricity to the ThermoCell pump when the carafe or extraction receptacle is removed from below the brew basket 81 or the pause & serve valve 79, a second electric switch (not shown) may be mounted somewhere in the apparatus to allow it to be turned off by the action of removing the receptacle. The squeeze plate 45 may be replaced or supplemented by a solenoid valve (not shown) connected in the water passageway between the water distributor 84 and the outlet port 40 of the ThermoCell pump. The solenoid valve would be configured to close the water passageway when either the first or second electric switch is automatically turned off.

Let us look at how the safety valve 27 and squeeze plate 45 works if the user opens the brew head 51. In the process of opening the brew head, the squeeze plate 45 gradually closes the conduit 36 by pushing it against the brew basket support wall 46a, thus gradually reducing the flow rate of the hot water out of the openings 83 of the water distributor 84 and completely shutting off the flow after brew head is half open. After the flow is shut off, the pressure in the Thermo-Cell increases quickly as the heater 14 continues to generate steam. After the pressure reaches Safety, the safety valve 27 opens and the pressurized steam exits the safety valve and condenses into water as it meets the cool water in the reservoir 2. The steam continues to enter the reservoir until the ThermoCell becomes dry or the heater 14 is turned off. (Note: If the first electric switch exists, it turns off the heater 14 when the brew head is open.)

It is appreciated that since the hot water and steam from the ThermoCell pump is under high pressure, a water filtration cartridge may be attached to the water distributor chamber 56 of FIG. 1 for removing impurities from the hot water before the water is distributed onto the flavor-containing materials. It is also appreciated that the brew head 51 and brew basket 81 may be replaced by water filtration device comprising an inlet connected to the conduit 36, a water filtration cartridge for removing impurities and bacteria from the hot water, and an outlet for discharging the purified hot water. It is further appreciated that the brew head 51 and brew basket 81 may be replaced by the existing brew head/brew basket assembly used in existing pump and steam espresso machines.

Having completed the discussions on all the components of the apparatus 1, now let us look at how to makes beverages such as coffee or espresso, again making reference to FIG. 1. To make coffee, one fills the reservoir 2 with the desired amount such as 10 cups of water, adjusts knob 62 to the desired coffee temperature and taste, and pushes the button 68 to open the brew head 61. A cup-shaped filter paper is placed into the brew basket 81 and the desired amount such as 4 scoops of coffee grounds is added into the filter paper. (The apparatus 1 can take from coarse and very fine coffee grounds due its high extraction efficiency and high extraction pressure.) The brew head 51 is then sealed to the brew basket 81 by simply pushing the brew head downwards until one hears a "click" sound produced by the spring 89 pushing the latch 86 into the opening 70. The water enters the ThermoCell 34 (i.e. chamber 34) through the openings 6a and 6b from the reservoir 2.

Turning on the electricity to the ThermoCell pump and the heater 14 heats the water in the ThermoCell 34. If there is air trapped in the ThermoCell, the heating may disturb the fluid therein and cause some trapped air to escape as air bubbles through the openings 6a and 6b. After the water in the ThermoCell is heated to a certain temperature, which may range from approximately 50 to 100° C. depending on the factors such as (1) the structure of the filling valve 33, (2) the ThermoCell 34, (3) residual pressure release valve 16, (4) the flow resistance downstream the outlet port 40, etc., the pressure in the ThermoCell will increase quickly as a result of steam generation by the heater 14. The pressure in the ThermoCell, in combination with the buoyancy force, upward fluid flow, steam bubble power and other possible forces, cause the filling valve 33 to close the openings 6a and 6b and the residual pressure release valve 16 to close the channel 25. The pressure in the ThermoCell also forces the hot water out of the outlet 37 and through the conduit 36, the brew head 51 and the coffee grounds (not shown) in cup-shaped filter paper 92. An almost water-tight seal is formed between the filter-paper seal ring and the outer perimeter area of the now wet cup-shaped filter paper. This allows the pressure to force the water to pass through the whole depth of the coffee grounds, through the section of the filter paper directly above the filter support ridges 92 and the extraction collecting channels 95, through the openings 93 and 77, and finally into the coffee receptacle (not shown) positioned below the pause & serve valve 79. After the water level in the ThermoCell reaches the outlet port 40, the pressurized steam is delivered into the brew basket, where the steam pressure forces the remaining water through the grounds and later the hot steam itself is forced through the grounds. (Note: the outlet port 40 may be made higher or lower relative to the bottom 39 to adjust the amount of steam to be generated.) As the pressurized hot steam passes through or partially through the grounds, it dries the grounds and essentially re-roasts the grounds to create additional aroma. About the time when all or almost all the water in the ThermoCell has been evaporated, the pressure in the ThermoCell, thus in the rest of the closed system including the brew basket, starts to decrease as the water in the grounds, if there is any left, and/or the hot steam are forced through the grounds. After the pressure decreases to $P_{residual}$, the residual pressure relief valve opens the channel 25, thus quickly relieving the residual pressure in the ThermoCell and the system. After the pressure in the ThermoCell reaches $P_{refill}$, the filling valve 33 opens the openings 6a and 6b, allowing water to flow into the ThermoCell from the reservoir 2. As cool water enters the ThermoCell, it causes the steam therein to condense and generates a vacuum, thus causing quick refilling of the ThermoCell. The above events (after the apparatus is turned on) take approximately 40 seconds if the ThermoCell has a volume about 60 cc and the heater 14 is about 1270 W.

With the ThermoCell now refilled with water, heater 14 heats the water. After the water in the ThermoCell is heated to a certain temperature, the pressure in the ThermoCell starts to increase quickly as described above. The process continues and repeats as described above until the reservoir 2 becomes empty or the brewing process is interrupted by the user.

The above process is schematically depicted in FIG. 8a, where the height (Y axis) represents the pressure in the ThermoCell, and the length (X axis) represents the time. FIG. 8a shows that after the apparatus is turned on, the pressure remains low or zero for a period of time when the heater 14 heats the water. After the water is heated to a certain temperature, the pressure starts to increase quickly to a maximum value, forcing hot water and steam into the brew head 51 and through the coffee grounds. This causes the pressure to decrease, and when the pressure decreases to $P_{residual}$, the residual pressure relief valve 16 opens and the pressure quickly decreases to $P_{refill}$. After the pressure decreases to $P_{refill}$, the filling valve 33 opens and the pressure in the ThermoCell immediately drops to a certain degree of vacuum due to the condensation of the steam in the ThermoCell when it meets the cold water from the reservoir 2. The pressure immediately reaches to ambient after water refills the ThermoCell. These steps complete the first pressure pulse as shown in FIG. 8a.

After the ThermoCell is refilled with water, it is ready to produce the $2^{nd}$ pressure pulse. Since the ThermoCell is already hot when it is refilled, the time required to heat the water to the certain temperature is significantly shorter. (Note: The heater 14 may be on continuously if not turned off by the thermostat 11 during the Steam pulse of the $1^{st}$ Pressure Pulse.) After the water in the ThermoCell is heated to this certain temperature, the pressure starts to increase quickly as in the $1^{st}$ Pressure Pulse. The length of time from the refilling of the ThermoCell to the end of the $2^{nd}$ Pressure Pulse is approximately 20 seconds under the same assumption for the $1^{st}$ Pressure Pulse. The $3^{rd}$ Pressure Pulse is only partly shown in FIG. 8a.

Figure 8C:
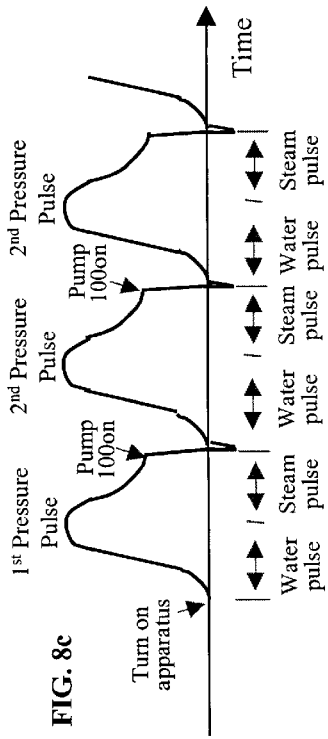
Figure 8B:
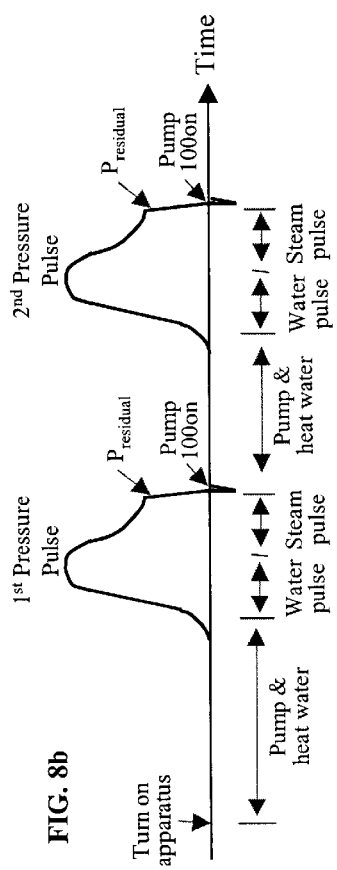

In FIG. 8b, the height (Y axis) again represents the pressure in the ThermoCell and the length (X axis) represents time, for the ThermoCell pump 15b of FIG. 5. The $1^{st}$ and $2^{nd}$ Pressure Pulses shown in FIG. 8b are described as follows:

Once the ThermoCell pump 15b is turned on, the mechanical pump 100 starts pumping water from the reservoir 2 into ThermoCell 34 and stops after a predetermined amount of time or amount of water pumped. The venting valve 124 is open when the mechanical pump fills the ThermoCell, to relieve pressure during the filling process. The heater 14 heats the water and generates pressurized steam in the ThermoCell. The pressure in the ThermoCell increases rapidly, reaches a peak and then decreases as the hot water (as the water pulse) and then steam (as the steam pulse) are forced through the outlet 37, conduit 36, residual pressure relief valve 16a, and the grounds in the brew basket 81 sealed to brew head 51. During this process the filling valve 33 and the venting valve 124 are closed by the pressure and/or other forces. After the pressure in the ThermoCell decreases to $P_{residual}$, the residual pressure relief valve 16a opens channel 25 and the pressure is quickly relieved, causing the venting valve to open and the pressure in the ThermoCell to return zero. This marks the end of the $1^{st}$ Pressure Pulse and the beginning of the $2^{nd}$ One. Again, the mechanical pump 100 starts pumping water from the reservoir 2 into ThermoCell 34, causing a partial vacuum as remaining steam is condensed by the cool water. The mechanical pump 100 stops after a predetermined amount of time or amount of water pumped. The venting valve 124 is open when the mechanical pump fills the ThermoCell. The heater 14 heats the water and generates pressurized steam in the ThermoCell for producing the $2^{nd}$ Pressure Pulse as shown in FIG. 8b.

Again, in FIG. 8c the Y axis represents pressure, and the X axis represents time, with reference to the ThermoCell pump 15c of FIG. 65 with the residual pressure relief valve 16a deleted. The $1^{st}$ and $2^{nd}$ Pressure Pulses shown in FIG. 8b are described as follows:

When ThermoCell pump 15b is turned on, the mechanical pump 100 delivers water from reservoir 2 to and through ThermoCell 34 for preheating the water, and through heating channel 116 for heating the water to a predetermined temperature, and then through conduits 128 and 36, and the coffee grounds in brew basket 81 sealed to brew head 51 for a $1^{st}$ period of time, which constitutes the water pulse of $1^{st}$ Pressure Pulse shown in FIG. 8c. The mechanical pump then stops; the heater 14 then produces pressurized steam in ThermoCell 34a, which closes the direction valve 74 and forces itself through the grounds in the brew basket, which constitutes the steam pulse of the 1st Pressure Pulse. Before all the steam in ThermoCell 34a is forced through the grounds (i.e. before the pressure drops to zero), the mechanical pump 100 starts to deliver water through the ThermoCell 34a for preheating the water, heating channel 116 for heating the water to a predetermined temperature, conduits 128 and 36, and the coffee grounds in brew basket 81 sealed to brew head 51 for a $2^{nd}$ period of time, which constitutes the water pulse of $2^{nd}$ Pressure Pulse as shown in FIG. 8c. (Again, as the cold water is pumped into ThermoCell 34a, the steam in the ThermoCell 34a condenses and causes a partial vacuum, as shown right after the mechanical pump 100 starts.) The mechanical pump then stops; the heater 14 generates in ThermoCell 34a pressurized steam, which closes the direction valve 74 and forces itself through the grounds in the brew basket, which constitutes the steam pulse of the $2^{nd}$ Pressure Pulse as shown in FIG. 8c. FIG. 8c also shows the beginning of the $3^{rd}$ Pressure Pulse. (Please Note: The pressure curves in the FIGS. 8a–c are prepared solely for the purposes of understanding the operations of the ThermoCell pumps. The shape of these curves, relative size of the various pressures, relative length of the various periods of time, etc. in these pressure curves may not, and are not intended, to represent the pressure curves of any actual ThermoCell pumps.)

FIG. 9 shows a variation of the apparatus 1 shown in FIG. 1. Similar to Apparatus 1, the apparatus 80 of FIG. 9 comprises a water reservoir having a main reservoir 2a and an under reservoir 2b, ThermoCell pump 15d housed in chamber 13 for producing pulses of pressurized hot water and steam, and brew basket 81a supported on brew basket support 46 and sealed to brew head 51 for allowing the extraction of flavor-containing materials such as coffee, tea or herbs therein by the pulses of pressurized hot water and steam from the ThermoCell pump.

ThermoCell pump 15d is attached to the under reservoir 2b that is located below the bottom 167 of the brew basket support 46 and connected to the backside of the main reservoir 2a. Like the ThermoCell pump 15 or 15a of FIGS. 1 or 4, ThermoCell pump 15d comprises upper ThermoCell body 5, lower ThermoCell body 12, filling valve 33a, residual pressure relief valve 16b, and safety valve 27. The upper and lower ThermoCell bodies are attached in a leak proof way and form the ThermoCell or chamber 34. The electric heater 14 is cast or staked into the lower portion of the lower ThermoCell body 12 for heating the water and generating pressurized steam in the chamber 34. Another heater 14a is attached to warmer plate 47, which is insulated from the housing of the apparatus 1 by heat resistant gasket 48, for keeping the brewed beverage in a receptacle 114 such as a carafe or cup warm. The temperature control device such as a thermostat 11 is attached to the lower ThermoCell body for automatically turning off the heater 14 when the temperature is raised to a predetermined value. A pump outlet 37 is formed at the lower ThermoCell body and is connected to the residual pressure relief valve 16b via a heat and pressure resistant conduit 36. The pump outlet 37 is connected to outlet port 40 at the bottom of the lower ThermoCell body.

The filling valve 33a comprises an upper valve body 22 having four radial wings 4 supported by the base 7 of the upper ThermoCell body 5, lower valve body 12 having its upper end connected to the upper valve body 5 and its lower end extending through the opening 6a of the upper ThermoCell body into the chamber 34, and valve seal 8 attached to the lower end of the lower valve body. The filling valve 33a is essentially the same and performs the same functions as the filling valves 33 in FIG. 1 and FIG. 4, and as a result will not be discussed further.

The residual pressure relief valve 16b is essentially the same as the residual pressure relief valve 16a of FIG. 4 except that the fluid outlet 107 is relocated to the top of the upper body 106 and the safety valve 27 is relocated to the upper body 106. In this new arrangement, the channel 25 of the residual pressure relief valve 16b is connected to the safety valve chamber 29 leading to atmosphere or the reservoir. The inlet channel 32 of the safety valve 27 is connected to the chamber 111 of the residual pressure relief valve 16b. The safety valve 27 here is also essentially the same as safety valve 27 in FIG. 4.

The fluid outlet 107 of the residual pressure relief valve 16b is of tubular shape. It is first extended upwards and then turned 90 degrees, becoming tube 107a. Tube 107a is dimensioned to fit into a cylindrical opening 130 formed at the back support member 132 of the brew head 51. The cylindrical opening 130 is connected into water distribution chamber 56 of the brew head 51 through inlet channel 52. An opening 133 is formed at such a. position on the side wall of the tube 107a that the fluid outlet 107 is connected to the chamber 56 through the opening 133 and inlet channel 52 when the brew head 51 is sealed to the brew basket 81a, and that the fluid outlet 107 is disconnected to the chamber 56 when the brew head 51 is turned open. As shown in FIG. 11, one or two seal gaskets 131, preferably of low friction, such as Teflon gasket, are inserted between the back end 132 and the outlet 107 for forming a water-tight seal. A support bar 134 extending from the top of the upper body 106 is inserted to a recess on the back support member 132 opposing the outlet 107 for providing additional support for the brew head and for enforcing the water tight seal at the seal gasket 131. The back support member 132 and the upper body 106 are made of heat and pressure resistant, and preferably low function materials. A cylindrical sleeve 147 (FIG. 1) is formed around the water distribution chamber and a seal member 148 like an O-ring is attached to the outer wall of the sleeve for forming a water tight seal with the brew basket when the brew head is closed. The sleeve 147 is made pliable enough to expand when the pressure in the basket increases, thus improving the seal between the seal member 148 and the brew basket 81a.

The brew basket 81a here is essentially the same as the brew basket 81 of FIG. 1 except that the discharging outlet 93 is extended upwards through channel 158 and the pause & serve valve 156 is attached to the upper end of the channel 158. The pause & serve valve comprises a valve chamber 150 connected to the discharging outlet 93 through channel 158 and to the mouth 157 of the receptacle 114 through an opening 152 formed on the side wall of the chamber, a seal member 151 attached to the stem of valve body 155, and a loaded spring 149 placed between the side wall of the chamber 150 and the valve body cause the seal member 151 to close the opening 152 when receptacle 114 is removed. The receptacle has a lid 159 and a activator 154 formed on the lid for pushing the valve body 155 to open the opening 152 when the receptacle is placed on the warm plate 47.

On the upper front of the apparatus is formed a brew head locker 68a, similar to the brew head locker 68 of FIG. 1. Brew head locker 68a comprises a rectangle chamber 142 formed on the front wall 153 of the main reservoir 2a and having at its bottom a thin rectangle plate 141 and a spring 143 with its upper end attached to the plate 141 and lower end to the bottom of the chamber, a rectangle bar 139 extended from the brew head and having at its lower end a first lock member 140 receivable in chamber 142, a first rectangle case 136 attached to the front wall 153 and enclosing a second lock member 135 fitted slidingly into a rectangle opening formed on the upper front wall of the chamber 142, and a second rectangle case 138 enclosing part of the case 136. The second lock member 135 has a lever 145 extended out of the first case 136 through a rectangle opening 144. To open or unlock the brew head 51, one simply pushes the second case 138, which in turn pushes the lever 145 and causes the second lock member 135 to retrieve from the chamber 142 into the first case 136, thus setting the first lock member 140 free. The loaded spring 143 pushes the thin plate 141, which in turn pushes the first lock member 140 upwards, therefore opening the brew head. To close or lock the brew head, one simply pushes the brew head downward until hearing a "click" sound caused by the spring 137 pushing the second lock member 135 against the extension bar 139 after the first lock member 140 is pushed past the second lock member.

The operation of the apparatus 80 is similar to that of the apparatus 1, thus will not be repeated here. However, It should be noticed that during the brewing process, the pressure in the brew basket 81a forces the extraction from the flavor-containing materials out of the discharging outlet 93, the channel 158 and the pause & serve valve 156 into the receptacle 114. The steam pulse at the second part of the pressure pulse will push any residual water and extraction liquid out of the brew basket and the channel 158 and into the receptacle. It is appreciated that it is possible to have the pause & serve valve located near the top of the brew basket 81a without causing any issues related to residual water or extraction inside the brew basket. When the pause & serve valve is located near the top of the brew basket, the front part of the main reservoir 2a may be removed, thus making the water reservoir, brew basket and the ThermoCell pump all on the left (back) side of the apparatus and the receptacle or carafe on the right front side of the apparatus. It is also possible that the main reservoir 2a may be removed completely so that the under reservoir 2b becomes the reservoir for the apparatus. In this case, water is added into the reservoir through an opening (not shown) that is formed at the bottom 167 of the brew basket support chamber 46.

The scope of the invention is obviously not restricted to the embodiments described by way of examples and depicted in the drawings, there being numerous changes, modifications, additions, and applications thereof imaginable within the purview of the claims.

What is claimed is:

1. Apparatus for extracting flavor-containing materials such as coffee, tea or herbs to make a flavor-containing liquid, comprising:

a water reservoir for receiving a supply of water;

a container for containing an amount of the flavor-containing materials and for allowing the extraction of the flavor-containing materials under pressure therein; and a fluid delivery system for generating a plurality of pressure pulses, each pressure pulse comprising a hot water pulse and a steam pulse, and for delivering the plurality of pressure pulses through the flavor-containing materials in the container, thereby extracting useful compounds out of the flavor-containing materials under the pressure of the pressure pulses, the fluid delivery system including a chamber, a heater in heat conducting relation with the chamber to heat water in the chamber and to produce steam, a conduit for delivering water from the reservoir to the chamber, a valve disposed in the conduit between the reservoir and the chamber which opens to permit water to flow from the reservoir to the chamber when pressure in the chamber drops below a predetermined pressure, and a fluid passage connecting the chamber and the container to allow the hot water and steam to be forced through the flavor-containing materials in said container by the pressure of the pressure pulse.

2. The apparatus of claim 1, wherein the fluid passage is in communication with the chamber at substantially the lowest point in the chamber so that any water in the chamber will be forced out through the fluid passage before any steam.

3. The apparatus of claim 1, wherein the predetermined pressure is achieved when substantially all of the hot water and steam has been forced from the chamber.

4. The apparatus of claim 1, wherein the container comprises a filter paper chamber for receiving a disposable filter paper in which the flavor-containing material can be placed, a support member for support a first part of the filter paper through which part the extraction is filtered and for collecting the extraction from the first part of the filter paper, an outlet for discharging the extraction from the first part of the filter paper, and a filter-paper seal for forming a substantially water-tight seal with a second part of the filter paper that surrounds the first part of the filter paper, thereby preventing loss of pressure and allowing the flavor-containing materials to be extracted under the pressure of the pressure pulses.

5. The apparatus of claim 1, wherein the fluid passage comprises a brew head removably mounted to the container in a water-tight manner.

6. The apparatus of claim 5, wherein the brew head further comprises a fixture for receiving a water filter cartridge for removing impurities from the hot water and steam in the pressure pulses before the hot water and steam reach the flavor-containing materials in the container.

7. The apparatus of claim 6, wherein the brew head comprises apparatus for receiving and supporting a prepackaged cartridge of flavor-containing materials.

8. The apparatus of claim 7, further comprising a cartridge of flavor-containing material disposed in the apparatus for receiving and supporting the cartridge in the brew head.

9. The apparatus of claim 1, further comprising a steam delivery system for delivering pressurized steam to a steam utilization device, the steam delivery system including a steam passage having a steam inlet port located at the upper portion of the chamber and a steam outlet connected to the steam utilization device, and a water preventer for preventing the flow of water out of the steam outlet but without significantly restricting the flow of steam out of the steam outlet.

10. The apparatus of claim 1 wherein the fluid passage comprises a brew head adapted to connect in a water-tight manner to the container, the brew head comprising a first end rotationally attached to the apparatus, a second end adapted to be lifted up to make the container accessible to the users and to be pushed down to seal to the container, and a lock for maintaining the water-tight seal between the brew head and the container.

11. The apparatus of claim 10, wherein the lock comprises a latch-catch type device attached to the brew head apparatus, and an automatic opening mechanism for pushing the brew head upwards from the container as soon as the latch is released.

12. Apparatus for extracting flavor-containing materials such as coffee, tea or herb under elevated pressure to make flavor-containing liquid comprising:

water reservoir for receiving a supply of water;

container for containing an amount of the flavor-containing materials and for allowing the extraction of the flavor-containing materials under pressure therein; and pressure pulse generator capable of generating at least one pressure pulse, each comprising pressurized hot water and steam, said pulse generator comprising a chamber, a heater in heat conducting relation with said chamber to heat water and produce steam, a pump mechanism for introducing an amount of water from said reservoir to or through said chamber, said amount of water being heated by said heater to generate hot water and pressurized steam, and for delivering the hot water and pressurized steam as a pressure pulse through the flavor-containing materials in said container, thereby extracting the flavor-containing materials under the pressure of the pressure pulse; and a valve for relieving the pressure in said container after the pressure therein has decreased as a result of the hot water and steam being forced out of said chamber and through the flavor-containing materials in said container to a predetermined pressure, at which predetermined pressure hot water and steam in the pressure pulse have been forced through the flavor-containing materials in said container.

13. Apparatus as defined in claim 12 wherein said pump mechanism comprises a filling valve in communication with said valve for controlling the passageway between said chamber and said reservoir and an outlet located near the lowest portion of said chamber for the pressurized steam therein to force the hot water and steam as the pressure pulse out of said chamber and through the flavor-containing materials in said container, said filling valve opening said passageway thus introducing a next amount of water from said reservoir to said chamber after said valve has relieved nearly all the pressure in said chamber.

14. Apparatus as defined in claim 13 wherein said seal member comprises a upper end capable of forming a water-tight seal with the first end of said channel and a lower end having features such as recessed or concave surface for facilitating the closing of said channel by said seal member.

15. Apparatus as defined in claim 12 wherein said pump mechanism comprises a mechanical pump for introducing said amount of water to said chamber from said reservoir, a direction valve for allowing the flow from said mechanical pump to said chamber but preventing the reverse flow, and an outlet located near the lowest portion of said chamber for the pressurized steam therein to force the hot water and steam as the pressure pulse out of said chamber and through the flavor-containing materials in said container.

16. Apparatus as defined in claim 12 wherein said pump mechanism comprises a mechanical pump for introducing said amount of water from said reservoir to and through said chamber, a direction valve for allowing the water flow from said mechanical pump to said chamber but preventing the reverse fluid flow, and a heating channel also in heat conducting relation with said heater having a channel inlet leading to said chamber and a channel outlet leading to said container, a first portion of said amount of water being delivered under pressure through said chamber and heating channel as part of the pressure pulse by said mechanical pump while a second portion of said amount of water being evaporated in said chamber or heating channel and being forced out of said channel outlet as part of the pressure pulse by the steam pressure in said chamber and through the flavor-containing materials in said container.

17. Apparatus as defined in claim 12 wherein said pump mechanism comprises a mechanical pump for introducing said amount of water to and through said chamber from said reservoir and a heating channel also in heat conducting relationship with said heater, said mechanical pump delivering under pressure a first portion of said amount of water through said chamber and heating channel to heat the water as part of the pressure pulse and a second portion of said amount of water through said chamber and heating channel to evaporate the water as part of the pressure pulse and through the flavor-containing materials in said container.

18. Apparatus as defined in claim 12 wherein said residual pressure relief valve comprises a channel having first end of a predetermined size in communication with said chamber and a second end in communication with atmosphere or said reservoir and a seal member of a predetermined weight movable between a first position in which it opens the first end of said channel and a second position in which it closes the first end of said channel.

19. Apparatus as defined in claim 12 further comprising a steam delivery system for delivering pressurized steam to a steam utilization device, said steam delivery system comprising a steam passage having a steam inlet port located at the top of said chamber and a steam outlet connected to said steam utilization device, and a water preventer for preventing the flow of water out of said steam outlet but without significantly restricting the flow of steam out of said steam outlet.

20. Apparatus as defined in claim 12 further comprising a brew head adapted to form a water-tight with said container, said brew head comprising a first end rotationally attached to said apparatus, a second end adapted to be lifted up to make said container accessible to the users and to be pushed down to seal to said container, and a lock for maintaining the water-tight seal between said brew head and container.

21. Apparatus as defined in claim 20 wherein said lock comprises a latch-catch type device attached to said brew head and apparatus, and an automatic opening mechanism such as a spring for pushing said brew head upwards from said container as soon as said latch is released.

22. Apparatus as defined in claim 12 further comprising safety system for restricting and preferably stopping the hot water and steam flow from said chamber to said container when the operation of said apparatus is interrupted.

23. Apparatus as defined in claim 12 further comprising a safety valve for automatically releasing the steam pressure atmosphere after the pressure in said apparatus exceeds a predetermined value.

24. Apparatus as defined in claim 12, further comprising a vent valve for facilitating the filling of said chamber with water, said vent valve comprising a vent having one end communicating with atmosphere and another end with the top of said chamber and a seal member adapted to open said vent before a predetermined water has entered said chamber and to close said vent after a predetermined water has entered said chamber.

25. Apparatus as defined in claim 12, further comprising a controller such as a thermostat or a timer for automatically turning off said pressure pulse generator after a predetermined amount of extraction has been prepared.

26. Apparatus as defined in claim 12 wherein said pump mechanism comprises a mechanical pump for in producing water to or through said chamber from said reservoir arid a direction valve downstream of said mechanical pump for preventing the steam in the pressure pulse from reaching said mechanical pump and causing steam to flow to or through the flavor-containing materials in said container.

27. Apparatus as defined in claim 12 further comprising a steam system for delivering pressurized steam to a steam utilization device, said steam system comprising a steam passage having a steam inlet port located at the upper portion of said chamber and a steam outlet connected to said steam utilization device, and means for preventing the flow of water out of said steam outlet but without significantly restricting the flow of steam out of said steam outlet.

28. Apparatus for extracting flavor-containing materials such as coffee, tea or herbs under pressure to make flavor-containing liquid, comprising:
   a water reservoir for receiving a supply of water;
   a container for containing an amount of the flavor-containing materials and for allowing the extraction of the flavor-containing materials under pressure therein;
   chamber for receiving an amount of water from said reservoir;
   a heater in heat conducting relation with said chamber to heat the water and generate hot water and steam pressure therein;
   a fluid delivery system comprising an outlet for said chamber for allowing the steam pressure to force the hot water and steam out of said chamber as a pressure pulse and a fluid passageway having a first end connected to said outlet and a second end connected to said container to allow the hot water and steam in the pressure pulse to be forced through the flavor-containing materials in said container by the steam pressure; and
   a valve for controlling the communication between said chamber and at least one of said reservoir or atmosphere, said valve being configured to relieve the pressure in said chamber after the pressure in said chamber decreases as a result of the hot water and steam being forced out of said chamber and through the flavor-containing materials in said container to a predetermined pressure, at which predetermined pressure hot water and steam in the pressure pulse have been forced through the flavor-containing materials in said container, and to establish the communication between said chamber and said reservoir thereby introducing a next amount of water from said reservoir to said chamber.

29. Apparatus as defined in claim 28 wherein said valve comprises a first valve for controlling the passage between said chamber and said reservoir and a second valve for controlling the communication between said chamber and atmosphere or said reservoir, said second valve being configured to relieve the pressure in said chamber after the pressure therein declines to the predetermined pressure, thereby causing said first valve to open the passage and introduce a next amount of water from said reservoir to said chamber.

30. Apparatus as defined in claim 29 wherein said second valve comprises a channel having first end in communication with said chamber and a second end in communication with atmosphere or said reservoir and a seal member movable between a first position in which it opens the first end of said channel and a second position in which it closes the first end of said channel.

31. Apparatus as defined in claim 30 wherein said valve seal member has a upper surface capable of forming a water-tight seal with the first end of said channel and a lower surface that is at least partly recessed or concave to facilitate the closing of said channel by said seal member.

32. Apparatus as defined in claim 28 wherein said valve comprises a passageway for communicating said chamber with said reservoir and a valve body having a valve seal operative between a first position in which said valve seal closes said passageway and a second position in which said valve seal opens said passageway, said passageway and said valve body being constructed and configured to allow said valve body to open said passageway when the pressure in said chamber declines to the is exerted to said valve body.

33. Apparatus as defined in claim 28 wherein said fluid delivery system comprises a brew control valve for the users of said apparatus to adjust the flow resistance in said fluid passageway, thereby adjusting the height, duration and shape of the pressure pulses.

34. Apparatus as defined in claim 28 wherein said fluid delivery system comprises a safety system for restricting and preferably stopping the hot water and steam flow from said chamber to said brew head after the operation of said apparatus is interrupted, the interruption including removal of the receptacle for receiving the extracted liquid or opening of said brew head during the operation.

35. Apparatus as defined in claim 28 wherein said container comprises a discharge outlet positioned a certain distance above the bottom of said container and a channel for connecting said container to said discharging outlet, thereby allowing the pressure in said container to force the extraction through said channel to said discharging outlet.

36. Apparatus as defined in claim 28 further comprising a steam delivery system for delivering pressurized steam to a steam utilization device, said steam delivery system comprising a steam passage having a steam inlet port located at the upper portion of said chamber and a steam outlet connected to said steam utilization device, and a water preventer for preventing the flow of water out of said steam outlet but without significantly restricting the flow of steam out of said steam outlet.

37. Apparatus as defined in claim 28 wherein said container is constructed to function also as a scoop for the flavor-containing materials such as coffee grounds, said container comprising an extraction chamber that function, also as scoop chamber, a permanent filter attached, to the bottom of said extraction chamber, a discharge outlet below said permanent filter for discharging the extraction from said permanent filter, a cup-level indicator on the interior wall of said extraction chamber, and a foldable handle for easiness in carrying and storing.

38. Apparatus as defined in claim 28 further comprising a safety valve having a passageway with one end connected to the top portion of said chamber and the other end connected to said reservoir or atmosphere for automatically releasing the steam in said chamber into said reservoir or atmosphere after the pressure in said chamber exceeds a predetermined value.

39. Apparatus as defined in claim 28 wherein said outlet of said fluid delivery system comprises an outlet port located a certain distance above the bottom of said chamber for increasing the amount of steam in each pressure pulse, a fluid outlet connected to said fluid passageway, and an outlet channel connecting said outlet port to said fluid outlet and being in heat conducting relation with said heater for further heating the hot water and steam in said outlet channel.

40. Apparatus as defined in claim 28 wherein said outlet is so constructed to cause certain amount of steam to be forced out of said chamber with the hot water.

41. A method for making flavor-containing liquid by extracting flavor-containing materials such as coffee, tea or herbs with a plurality of pressure pulses, comprising:

generating and delivering a first pressure pulse, comprising a pulse of pressurized hot water and a pulse of pressurized hot steam, to and through the flavor-containing materials in a container, wherein the flavor-containing materials being extracted by the pulse of pressurized hot water under the pressure of the first pressure pulse and being dried or potentially re-roasted by the pulse of pressurized hot steam;

generating and delivering a second pressure pulse, comprising a pulse of pressurized hot water and a pulse of pressurized hot steam, to and through the flavor-containing materials in a container, wherein the flavor-containing materials being extracted by the pulse of pressurized hot water under the pressure of the second pressure pulse and being dried or potentially re-roasted by the pulse of pressurized hot steam; and repeating the above step of generating and delivering pressure pulses to and through the flavor-containing materials in a container until a desired amount of flavor-containing liquid has been prepared.

42. A method as defined in claim 41 further comprising a step of relieving the pressure of the pressure pulse remained upstream of the flavor-containing materials in said container after the pressure of the pressure pulse has declined to a predetermined pressure.

43. Apparatus for extracting flavor-containing materials such as coffee, tea or herb to make flavor-containing liquid comprising:

a water reservoir for receiving a supply of water;

a container for containing an amount of the flavor-containing materials and for allowing the extraction of the flavor-containing materials under pressure therein; and a fluid delivery system for generating a plurality of pressure pulses, each pressure pulse comprising a hot water pulse and a steam pulse, and for delivering the plurality of pressure pulses through the flavor-containing materials in said container, therefore extracting useful compounds out of the flavor-containing materials under the pressure of the pressure pulses, said fluid delivery system comprising a chamber, a heater in heat conducting relation with said chamber to heat water and produce steam, a pump mechanism for introducing an amount of water from said reservoir to said chamber, the amount of water being heated by said heater to generate hot water and pressurized steam, and for delivering the hot water and steam as one of the plurality of pressure pulses to said container, and a fluid passage connected to said container to allow substantially all the hot water and steam in the pressure pulse to be forced through the flavor-containing materials in said container by the pressure of the pressure pulse, wherein said pump mechanism comprises a first valve for controlling the communication between said chamber and said reservoir, a second valve for controlling the communication between said chamber and atmosphere or said reservoir, and an outlet near the lowest portion of said chamber for the pressurized steam therein to force the hot water and steam out of said chamber as a pressure pulse to said container, said second valve being configured to relieve the pressure in said chamber after the pressure therein declines to a predetermined pressure, at which pressure hot water in the hot water pulse and the steam in the steam pulse of the pressure pulse have been forced through the flavor-containing materials in said container, thereby causing said first valve to open and introduce a next amount of water from said reservoir to said chamber.

44. Apparatus as defined in claim 43 further comprising a steam system for delivering pressurized steam to a steam utilization device, said steam system comprising a steam passage having a steam inlet port located at the upper portion of said chamber and a steam outlet connected to said steam utilization device, and a water preventer for preventing or reducing the flow of water out of said steam outlet but without significantly restricting the flow of steam out of said steam outlet.

45. Apparatus as defined in claim 44 wherein said water preventer comprises a super-hot channel in which water is heated to a highier temperature than in said chamber during the operation of said steam system.

46. Apparatus for extracting flavor-containing materials such as coffee, tea or herb to make flavor-containing liquid comprising:

a water reservoir for receiving a supply of water;

a container for containing an amount of the flavor-containing materials and for allowing the extraction of the flavor-containing materials under pressure therein; and a fluid delivery system for generating a plurality of pressure pulses, each pressure pulse comprising a hot water pulse and a steam pulse, and for delivering the plurality of pressure pulses through the flavor-containing materials in said container, therefore extracting useful compounds out of the flavor-containing materials under the pressure of the pressure pulses, said fluid delivery system comprising a chamber, a heater in heat conducting relation with said chamber to heat water and produce steam, a pump mechanism for introducing an amount of water from said reservoir to said chamber, the amount of water being heated by said heater to generate hot water and pressurized steam, and for delivering the hot water and steam as one of the plurality of pressure pulses to said container, and a fluid passage connected to said container to allow substantially all the hot water and steam in the pressure pulse to be forced through the flavor-containing materials in said container by the pressure of the pressure pulse, wherein said pump mechanism comprises a mechanical pump for introducing the amount of water to said chamber from said reservoir, a direction valve for allowing the flow from said mechanical pump to said chamber but preventing the reverse flow, and an outlet located near the lowest portion of said chamber for the pressurized steam generated by said heater to force the hot water in said chamber as the water pulse and the steam itself as the steam pulse of a pressure pulse out of said chamber and to said container.

47. Apparatus for extracting flavor-containing materials such as coffee, tea or herb to make flavor-containing liquid comprising:

a water reservoir for receiving a supply of water;

a container for containing an amount of the flavor-containing materials and for allowing the extraction of the flavor-containing materials under pressure therein; and a fluid delivery system for generating a plurality of pressure pulses, each pressure pulse comprising a hot water pulse and a steam pulse, and for delivering the plurality of pressure pulses through the flavor-containing materials in said container, therefore extracting useful compounds out of the flavor-containing materials under the pressure of the pressure pulses, said fluid delivery system comprising a chamber, a heater in heat conducting relation with said chamber to heat water and produce steam, a pump mechanism for introducing an amount of water from said reservoir to said chamber, the amount of water being heated by said heater to generate hot water and pressurized steam, and for delivering the hot water and steam as one of the plurality of pressure pulses to said container, and a fluid passage connected to said container to allow substantially all hot water and steam in the pressure pulse to be forced through the flavor-containing materials in said container by the pressure of the pressure pulse, wherein said pump mechanism comprises a mechanical pump for introducing the amount of water to and through said chamber from said reservoir, a direction valve for allowing the water flow from said mechanical pump to said chamber but preventing the reverse fluid flow, and a heating channel having a channel inlet leading to said chamber and a channel outlet leading to said container, a first portion of the amount of water being delivered under pressure through said chamber and heating channel as the hot water pulse of a pressure pulse by said mechanical pump while a second portion of the amount of water being forced out of said channel outlet as steam pulse of the pressure pulse by the pressurized steam downstream of said direction valve to said container.

48. Apparatus as defined in claim 47 wherein said chamber is constructed to be small or even part of said heating channel.

49. Apparatus for extracting flavor-containing materials such as coffee, tea or herb to make flavor-containing liquid comprising:

a water reservoir for receiving a supply of water;

a container for containing an amount of the flavor-containing materials and for allowing the extraction of the flavor-containing materials under pressure therein; and a fluid delivery system for generating a plurality of pressure pulses, each pressure pulse comprising a hot water pulse and a steam pulse, and for delivering the plurality of pressure pulses through the flavor-containing materials in said container, therefore extracting useful compounds out of the flavor-containing materials under the pressure of the pressure pulses, said fluid delivery system comprising a chamber, a heater in heat conducting relation with said chamber to heat water and produce steam, a pump mechanism for introducing an amount of water from said reservoir to said chamber, the amount of water being heated by said heater to generate hot water and pressurized steam, and for delivering the hot water and steam as one of the plurality of pressure pulses to said container, and a fluid passage connected to said container to allow substantially all the hot water and steam in the pressure pulse to be forced through the flavor-containing materials in said container by the pressure of the pressure pulse, wherein said pump mechanism comprises a mechanical pump for introducing the amount of water to and through said chamber from said reservoir and a heating channel also in heat conducting relationship with said heater having a channel inlet leading to said chamber and a channel outlet leading to said container, said mechanical pump delivering under pressure a first portion of the amount of water as the hot water pulse and the second portion of the amount of water as the steam pulse of a pressure pulse through said chamber and heating channel to said container.

50. Apparatus for extracting flavor-containing materials such as coffee, tea or herb to make flavor-containing liquid comprising:

a water reservoir for receiving a supply of water;

a container for containing an amount of the flavor-containing materials and for allowing the extraction of the flavor-containing materials under pressure therein;

a fluid delivery system for generating a plurality of pressure pulses, each pressure pulse comprising a hot water pulse and a steam pulse, and for delivering the plurality of pressure pulses through the flavor-containing materials in said container, therefore extracting useful compounds out of the flavor-containing materials under the pressure of the pressure pulses, said fluid delivery system comprising a chamber, a heater in heat conducting relation with said chamber to heat water and produce steam, a pump mechanism for introducing an amount of water from said reservoir to said chamber, the amount of water being heated by said heater to generate hot water and pressurized steam, and for delivering the hot water and steam as one of the plurality of pressure pulses to said container, and a fluid passage connected to said container to allow substantially all the hot water and steam in the pressure pulse to be forced through the flavor-containing materials in said container by the pressure of the pressure pulse; and a residual pressure relief valve for relieving the pressure in said chamber after the pressure in said chamber declines to a predetermined pressure, at which pressure hot water and steam in the pressure pulse has been forced through the flavor-containing materials in said container.

51. Apparatus as defined in claim 50 wherein said residual pressure relief valve comprises a channel having first end in communication with said chamber and a second end in communication with atmosphere or said reservoir and a seal member movable between a first position in which it opens the first end of said channel and a second position in which it closes the first end of said channel, said seal member having a upper end capable of forming a water-tight seal with the first end of said channel and a lower end having features such as recessed or concave surface for facilitating the closing of said channel by said seal member.

52. Apparatus for extracting flavor-containing materials such as coffee, tea or herb to make flavor-containing liquid comprising:

a water reservoir for receiving a supply of water;

a container for containing an amount of the flavor-containing materials and for allowing the extraction of the flavor-containing materials under pressure therein; and a fluid delivery system for generating a plurality of pressure pulses, each pressure pulse comprising a hot water pulse and a steam pulse, and for delivering the plurality of pressure pulses through the flavor-containing materials in said container, therefore extracting useful compounds out of the flavor-containing materials under the pressure of the pressure pulses, said fluid delivery system comprising a chamber, a heater in heat conducting relation with said chamber to heat water and produce steam, a pump mechanism for introducing an amount of water from said reservoir to said chamber, the amount of water being heated by said heater to generate hot water and pressurized steam, and for delivering the hot water and steam as one of the plurality of pressure pulses to said container, and a fluid passage connected to said container to allow substantially all the hot water and steam in the pressure pulse to be forced through the flavor-containing materials in said container by the pressure of the pressure pulse, wherein said pump mechanism comprises a valve for controlling the communication between said chamber and said reservoir and an outlet located near the lowest portion of said chamber for the pressurized steam therein to force the hot water and steam out of said chamber as a pressure pulse, said valve being configured to establish the communication and open the passageway between said chamber and said reservoir when the pressure in said chamber declines to a predetermined pressure, at which pressure hot water and steam in the pressure pulse has been forced through the flavor-containing materials in said container, thereby introducing a next amount of water from said reservoir to said chamber.

53. Apparatus for extracting flavor-containing materials such as coffee, tea or herb to make flavor-containing liquid comprising:

a water reservoir for receiving a supply of water;

a container for containing an amount of the flavor-containing materials and for allowing the extraction of the flavor-containing materials under pressure therein; and a fluid delivery system for generating a plurality of pressure pulses, each pressure pulse comprising a hot water pulse and a steam pulse, and for delivering the plurality of pressure pulses through the flavor-containing materials in said container, therefore extracting useful compounds out of the flavor-containing materials under the pressure of the pressure pulses, said fluid delivery system comprising a chamber, a heater in heat conducting relation with said chamber to heat water and produce steam, a pump mechanism for introducing an amount of water from said reservoir to said chamber, the amount of water being heated by said heater to generate hot water and pressurized steam, and for delivering the hot water and steam as one of the plurality of pressure pulses to said container, and a fluid passage connected to said container to allow substantially all the hot water and steam in the pressure pulse to be forced through the flavor-containing materials in said container by the pressure of the pressure pulse;

wherein said container comprises a filter paper chamber for receiving a disposable filter paper in which the flavor-containing materials can be disposed, a support member for supporting a first part of the filter paper through which part the extraction is filtered and for collecting the extraction from the first part of the filter paper, an outlet for discharging the extraction from the first part of the filter paper, and a filter paper seal for forming a substantially water-tight seal with a second part of the filter paper that surrounds the first part of the filter paper, thereby preventing loss of pressure and allowing the flavor-containing materials to be extracted under the pressure of the pressure pulses.

54. Apparatus for extracting flavor-containing materials such as coffee, tea or herb to make flavor-containing liquid comprising:

a water reservoir for receiving a supply of water;

a container for containing an amount of the flavor-containing materials and for allowing the extraction of the flavor-containing materials under pressure therein;

a fluid delivery system for generating a plurality of pressure pulses, each pressure pulse comprising a hot water pulse and a steam pulse, and for delivering the plurality of pressure pulses through the flavor-containing materials in said container, therefore extracting useful compounds out of the flavor-containing materials under the pressure of the pressure pulses, said fluid delivery system comprising a chamber, a heater in heat conducting relation with said chamber to heat water and produce steam, a pump mechanism for introducing an amount of water from said reservoir to said chamber, the amount of water being heated by said heater to generate hot water and pressurized steam, and for delivering the hot water and steam as one of the plurality of pressure pulses to said container, and a fluid passage connected to said container to allow substantially all the hot water and steam in the pressure pulse to be forced through the flavor-containing materials in said container by the pressure of the pressure pulse; and a steam delivery system for delivering pressurized steam to a steam utilization device, said steam delivery system comprising a steam passage having a steam inlet port located at the upper portion of said chamber and a steam outlet connected to said steam utilization device, and a water preventer for preventing the flow of water out of said steam outlet but without significantly restricting the flow of steam out of said steam outlet.

55. Apparatus for extracting flavor-containing materials such as coffee, tea or herb to make flavor-containing liquid comprising:

a water reservoir for receiving a supply of water;

a container for containing an amount of the flavor-containing materials and for allowing the extraction of the flavor-containing materials under pressure therein; and a fluid delivery system for generating a plurality of pressure pulses, each pressure pulse comprising a hot water pulse and a steam pulse, and for delivering the plurality of pressure pulses through the flavor-containing materials in said container, therefore extracting useful compounds out of the flavor-containing materials under the pressure of the pressure pulses, said fluid delivery system comprising a chamber, a heater in heat conducting relation with said chamber to heat water and produce steam, a pump mechanism for introducing an amount of water from said reservoir to said chamber, the amount of water being heated by said heater to generate hot water and pressurized steam, and for delivering the hot water and steam as one of the plurality of pressure pulses to said container, and a fluid passage connected to said container to allow substantially all the hot water and steam in the pressure pulse to be forced through the flavor-containing materials in said container by the pressure of the pressure pulse, wherein said fluid passage comprises a brew head adapted to connect in a water-tight manner to said container, said brew head comprising a first end rotationally attached to said apparatus, a second end adapted to be lifted up to make said container accessible to the users and to be pushed down to seal to said container, and a lock for maintaining the water-tight seal between said brew head and container.

56. Apparatus as defined in claim 55 wherein said lock comprises a latch-catch type device attached to said brew head and apparatus, and an automatic opening mechanism for pushing said brew head upwards from said container as soon as said latch is released.

57. Apparatus as defined in claim 55 further comprising a valve to restrict or stop the hot steam and water flow from said chamber to said brew head when said brew head is lifted up from said container.

58. Apparatus for extracting flavor-containing materials such as coffee, tea or herb to make flavor-containing liquid comprising:

a water reservoir for receiving a supply of water;

a container for containing an amount of the flavor-containing materials and for allowing the extraction of the flavor-containing materials under pressure therein; and a fluid delivery system for generating at least one pressure pulse, each said pressure pulse comprising a water pulse and a steam pulse, and for delivering the pressure pulse through the flavor-containing materials in said container, therefore extracting useful compounds out of the flavor-containing materials under the pressure of the pressure pulse, said fluid delivery system comprising a chamber, a heater in heat conducting relation with said chamber to heat water, a mechanical pump for delivering water from said reservoir to or through said chamber, fluid passage for connecting said chamber to said container to direct water and steam in the pressure pulse to the flavor-containing materials in said container, and a direction valve located downstream of said mechanical pump, said direction valve being adapted to allow water flow from said mechanical pump to said chamber but to prevent reverse flow of steam in the pressure pulse to said mechanical pump, thereby causing the steam in the steam pulse of the pressure pulse to flow through the wet flavor-containing materials in said container and dry the wet flavor-containing materials after the water pulse in the pressure pulse.

59. Apparatus as defined in claim 58 further comprising a residual pressure relief valve for relieving the pressure in said container after the pressure therein declines to a predetermined pressure, at which pressure at least most water and steam in the pressure pulse has passed through the flavor-containing materials in said container.

60. Apparatus as defined in claim 58 further comprising a steam generating system for delivering pressurized steam to a steam utilization device, said system comprising a steam passage having a steam inlet port connected to said chamber and a steam outlet connected to said steam utilization device, and a super-hot channel in which water is heated to a temperature higher than in said chamber during the operation of said system for preventing or reducing the flow of liquid water out of said steam outlet.

* * * * *